United States Patent [19]

Simon et al.

[11] Patent Number: 5,007,068
[45] Date of Patent: Apr. 9, 1991

[54] DOPPLER-CORRECTED DIFFERENTIAL DETECTION SYSTEM

[75] Inventors: Marvin K. Simon, La Canada; Dariush Divsalar, Pacific Palisades, both of Calif.

[73] Assignee: The United States of America as represented by the Administrator of the National Aeronautics and Space Administration, Washington, D.C.

[21] Appl. No.: 203,374

[22] Filed: Jun. 7, 1988

[51] Int. Cl.$^5$ .............................................. H04B 1/10
[52] U.S. Cl. ..................................... 375/53; 375/56; 375/85; 375/97
[58] Field of Search ....................... 375/39, 77, 80, 84, 375/94, 95, 120, 96, 99, 101, 53, 56, 85, 97; 329/50, 100, 120, 304, 308; 455/202, 203, 204; 342/99, 100, 101, 102, 103

[56] References Cited

U.S. PATENT DOCUMENTS

| | | | |
|---|---|---|---|
| 3,768,096 | 10/1973 | Dentino | 342/99 |
| 3,794,921 | 2/1974 | Unkauf | 375/84 |
| 3,849,779 | 11/1974 | Boyd | 342/103 |
| 3,991,377 | 11/1976 | Salazar et al. | 375/84 |
| 3,993,956 | 11/1976 | Gilmore et al. | 375/84 |
| 4,419,759 | 12/1983 | Poklemba | 375/97 |
| 4,472,815 | 9/1984 | Gutleber | 375/96 |
| 4,472,817 | 9/1984 | Poklemba et al. | 375/97 |
| 4,520,493 | 5/1985 | Heard et al. | 375/97 |
| 4,663,595 | 5/1987 | Mehrgardt et al. | 329/50 |
| 4,731,800 | 3/1988 | Motley et al. | 375/60 |

OTHER PUBLICATIONS

A. Lender, "The Duobinary Technique for High Speed Data Transmission", IEEE Transactions on Communication Electronics, vol. 82, May 1963, pp. 214–218.

A. J. Viterbi, A. M. Viterbi, "Nonlinear Estimation of PSK-Modulated Carrier Phase With Application to Burst Digital Transmission", IEEE Transactions on Information Theory, vol. IT-29, No. 4, Jul. 1983, pp. 543–551.

R. F. Pawula, S. O. Rice and J. H. Roberts, "Distribution of the Phase Angle Between Two Vectors Perturbed by Gaussian Noise", IEEE Transactions on Communications, vol. COM-30, No. 8, Aug. 1982, pp. 1828–1841.

Lee, "Computation of the Bit Error Rate of Coherent M-ary PSK with Gray Code Bit Mapping", IEEE Transactions on Communications, vol. COM-34, No. 5, May 1986, pp. 488–490.

Primary Examiner—Benedict V. Safourek
Assistant Examiner—Stephen Chin
Attorney, Agent, or Firm—Thomas H. Jones; Harold W. Adams; John R. Manning

[57] ABSTRACT

Doppler in a communication system operating with a multiple differential phase-shift-keyed format ("MDPSK") creates an adverse phase shift in an incoming signal. An open loop frequency estimation is derived from a Doppler-contaminated incoming signal. Based upon the recognition that, whereas the change in phase of the received signal over a full symbol contains both the differentially encoded data and the Doppler induced phase shift, the same change in phase over half a symbol (within a given symbol interval) contains only the doppler induced phase shift, and the Doppler effect can be estimated and removed from the incoming signal. Doppler correction occurs prior to the receiver's final output of decoded data. A multiphase system can operate with two samplings per symbol interval at no penalty in signal-to-noise ratio provided that an ideal low pass pre-detection filter is employed, and two samples, at $\frac{1}{4}$ and $\frac{3}{4}$ of the symbol interval $T_s$, are taken and summed together prior to incoming signal data detection.

31 Claims, 13 Drawing Sheets

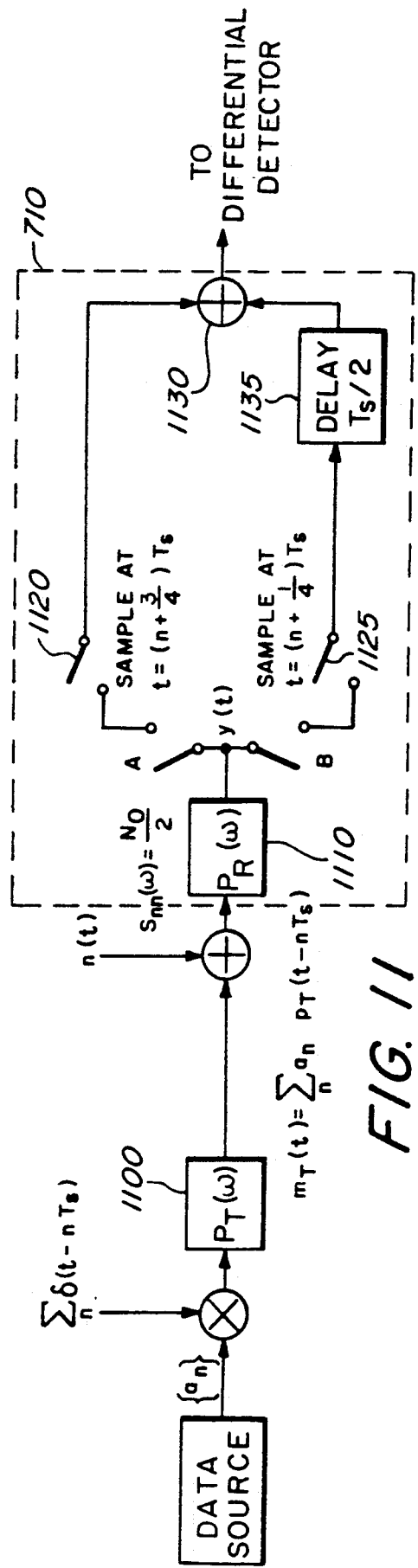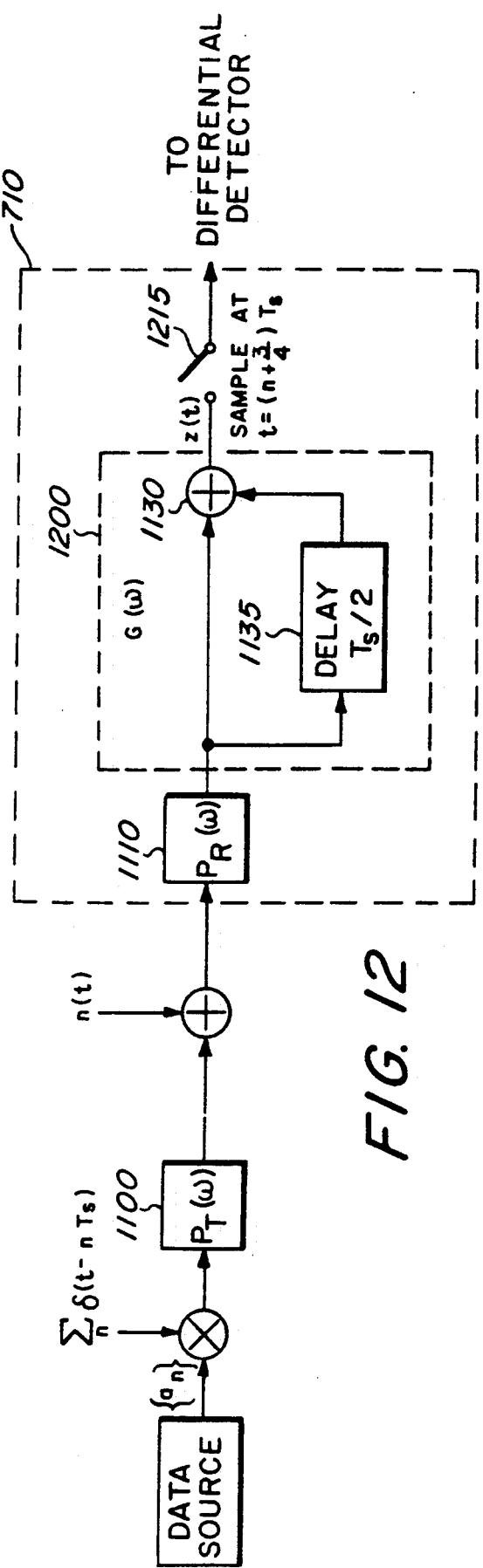
FIG. 11
FIG. 12

DOPPLER-CORRECTED DIFFERENTIAL DETECTION SYSTEM

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

This invention relates to an improved communication system which is provided with a Doppler-corrected differential detector located in the communication system's receiver.

BACKGROUND ART

Digital data communication systems employing a carrier that is modulated by data at a transmitter and demodulated at a receiver to decode the transmitted data are well known. Several different types of modulation and demodulation are known and used. This invention pertains to a type of modulation-demodulation which employs data transmission through multiple differential phase-shift-keying ("MDPSK") at the modulator and a comparable differential detection at the system's receiver or demodulator.

Modems, a contraction for modulators and demodulators, are commonly used at both ends of a data communication transmission system. When one modem physically moves relative to another modem in a transmission link, the transmitted signals experience a Doppler effect. Typically Doppler effects are experienced in an earth to space satellite link and cause an effective change of frequency of a received signal due to the relative velocity of the link's transmitter with respect to the link's receiver. The Doppler effect must be rectified in order to achieve efficient data transmission and reception.

A prior art search related to the invention discloses some typical approaches to Doppler correction. Not one of the references located in the search, however, discloses or suggests an open-loop Doppler frequency estimation derived from an incoming signal. Moreover, open-loop correction for a Doppler effect in a MDPSK system having an improved filtering and differential detection configuration is not disclosed in the prior art.

The following search-located U.S. Pat. Nos. include: Heard et al 4,520,493, Poklemba 4,419,759, Poklemba et al 4,472,817 and Mehrgardt et al 4,663,595.

Heard '493 discloses a complex closed-loop Doppler correction scheme that decodes and then attempts to correct for the next expected Doppler effect. Such closed loop tracking is not feasible in certain Doppler-related-applications e.g., a multipath fading environment. Poklemba et al '817 discloses open loops but does not disclose Doppler correction in a differential detection system. Poklemba '759 is a typical phase-locked loop system. Mehrgardt '595 is of marginal interest only in that it discloses delays and summers in a form typically known in the modulator/demodulator art.

A multipath fading . environment creates uncertainties in the carrier phase and/or frequency. These uncertainties essentially eliminate the known techniques which use a phase and/or frequency tracking synchronization loop. Moreover, the above-noted uncertainties may be further masked by phase jitter on the carrier reference. This additional transmission impairment adds further complexity to the system operation. Differential detection employs, as a demodulation reference, the phase and frequency of the carrier corresponding to the previous transmitted data symbol. The deleterious effects in a multipath fading environment are largely avoided by that differential system approach because there is no requirement that the carrier must be synchronized during each present symbol interval.

Another known transmission impairment is intersymbol interference (ISI). It is known to use pulse shaping so that the ISI at a receiver is at a minimum at the sampling point for data detection by the receiver Splitting signal filtering between the transmitter and receiver locations is a known way of achieving pulse shaping and minimum ISI.

For MDPSK systems it is common to strive for what is known as a 100% raised-cosine spectrum at the decoder's input. In an MDPSK system such shaping will achieve a satisfactory signal to noise ratio for center sampling at the decoder or demodulator. Various types of multilevel coding and decoding schemes have been introduced in efforts to achieve an optimum signal to noise ratio for such center sampling. Included within these multilevel schemes is the so-called duobinary signaling, a partial response signaling scheme as taught in A. Lender, "The Duobinary Technique for High Speed Data Transmission," IEEE Transactions on Communication Electronics, Vol. 82, May 1963, pp. 214–218.

STATEMENT OF THE INVENTION

The invention features an open loop frequency estimation derived from a Doppler-contaminated data-modulated input signal. A Doppler estimate is obtained in a doppler-estimating circuit and that estimate is followed by Doppler correction prior to the receiver's decoding of the modulated data. An overall Doppler-corrected differential detection system of simple and efficient design is thus provided.

One of the key features of the invention is based upon the inventor's recognition that whereas the change in phase of the received signal over a full symbol contains the sum of the differentially encoded data and the Doppler induced phase shift, the same change in phase over half a symbol (within a given symbol interval) contains only the Doppler induced phase shift. Thus, by proper open-loop processing, including post-detection integration (whose duration is related to the rate of change of the Doppler), the Doppler effect can be estimated and removed from the incoming signal.

It has been further discovered that a multiphase system can operate with two samplings per symbol interval at no penalty in signal-to-noise ratio. This discovery is possible provided that an ideal low pass pre-detection filter is employed, and two samples, at ¼ and ¾ of the symbol interval $T_s$, are taken and summed together prior to decoding.

BRIEF DESCRIPTION OF THE DRAWING

FIG. 11 is a mathematical model which is useful in describing a more complex feature of the invention;

FIG. 12 is a mathematical equivalent of FIG. 11;

DETAILED DESCRIPTION OF THE INVENTION

Figure 1:
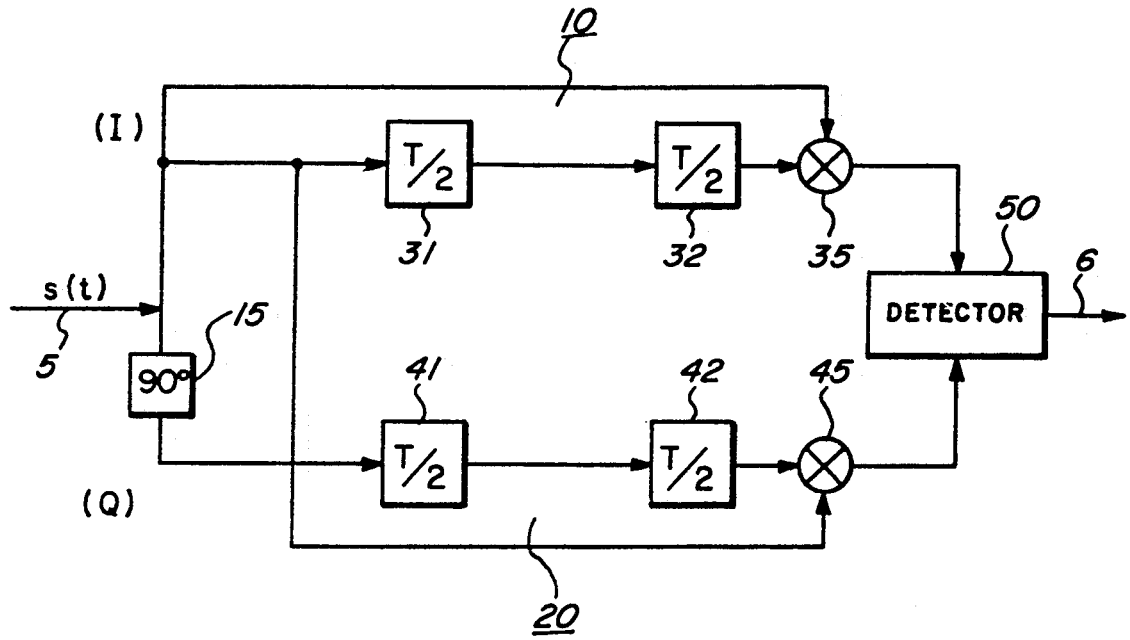
FIG. 1 depicts a prior art differentially coherent receiver employing a full symbol delay.

FIG. 1 is a typical block diagram of a known differential detector in a MDPSK receiver. At input terminal 5 an input signal s(t) which may include modulated data and Gaussian noise is split into an in-phase (I) and a quadrature phase (Q) channel 10 and 20 respectively. The quadrature phase channel 20 includes a 90 degree phase shifter 15.

Each channel includes a full symbol interval delay provided by two half-symbol delay networks 31, 32 and 41, 42. Each network thus provides a one-half symbol delay time. Multiplying junctions 35, 45 multiply the undelayed and delayed signals together to form a basis for comparing two different time-related phase angles of the input signals applied to those multiplying junctions 35, 45. The output of each multiplying junction is applied to a detector 50, which detector determines the angular difference between s(t) and s(t) delayed by one symbol and applies a decoded output signal an output lead 6. Both in-phase (I) and quadrature phase (Q) channels 10, 20 are required to represent the well-known phasor diagrams of the prior art.

Figure 2:
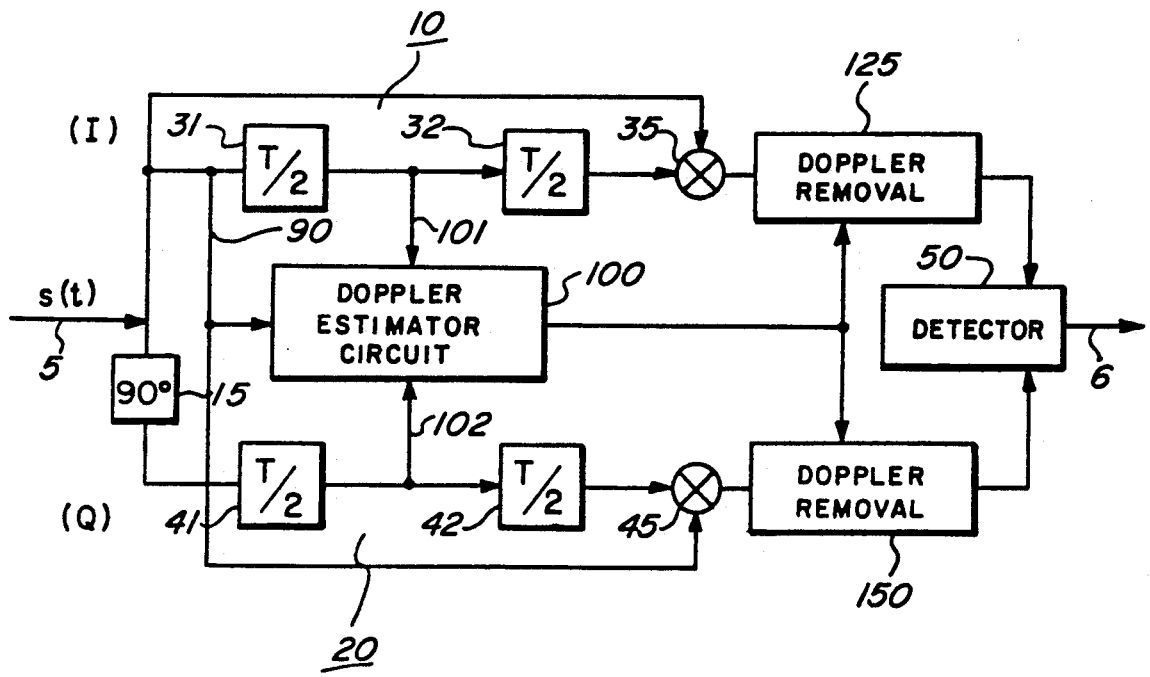
FIG. 2 is a basic block diagram of an open-loop Doppler-corrected differentially coherent receiver system in accordance with the invention.

FIG. 2 includes the broad concept of the Doppler-corrected differential phase detection of the invention. A key feature of the invention is provided by a Doppler estimator circuit 100 which requires input signals from both the in-phase channel 10 and the quadrature channel 20. The in-phase channel 10 supplies a pair of input signals to circuit 100 in the form of an incoming signal s(t) and a delayed version thereof. Doppler estimator circuit 100 receives the incoming signal s(t) over lead 90 and also receives a one-half (T/2) delayed version of that incoming signal over lead 101, which lead connects the output of the T/2 delay circuit 31 to Doppler estimator 100. Simultaneously the quadrature channel 20 applies an input signal to circuit 100 in the form of a phase shifted s(t) and a delayed version thereof. Being delayed by less than a full symbol interval, the input signals from channels 10 and 20, into Doppler estimator 100 have the same data-representing phase; but, with proper processing, the Doppler-induced change in phase in the incoming signal s(t) can be estimated in circuit 100.

Multipliers 35 and 45, operating as before, are connected as in FIG. 1. Doppler removal is done in both the channels and it will now be described.

Between the multipliers 35, 45 and decoder 50 are located Doppler removal circuits 125 and 150. Each Doppler removal circuit receives the estimated Doppler signal from estimator 100 and that estimated signal, prior to signal decoding in detector 50, is removed by Doppler removal circuits 125, 150 in the (I) and (Q) channels 10, 20, respectively. With the Doppler effect nullified, detector 50, in known fashion, delivers a data-representing output signal on lead 6 in accordance with standard MDPSK decoding techniques.

The detector 50 may be of any suitable and known type. Such detectors include the type which employ a maximum-likelihood decoding algorithm. Further processing of the output signal on lead 6 depends upon whether the transmitted data is coded or uncoded. In the case of uncoded data, a decision on the output is conventional as known for FIG. 1. For coded transmission, the output is used directly (in practice, it is Q-BIT quantized) as a soft decoding metric.

Figure 3:
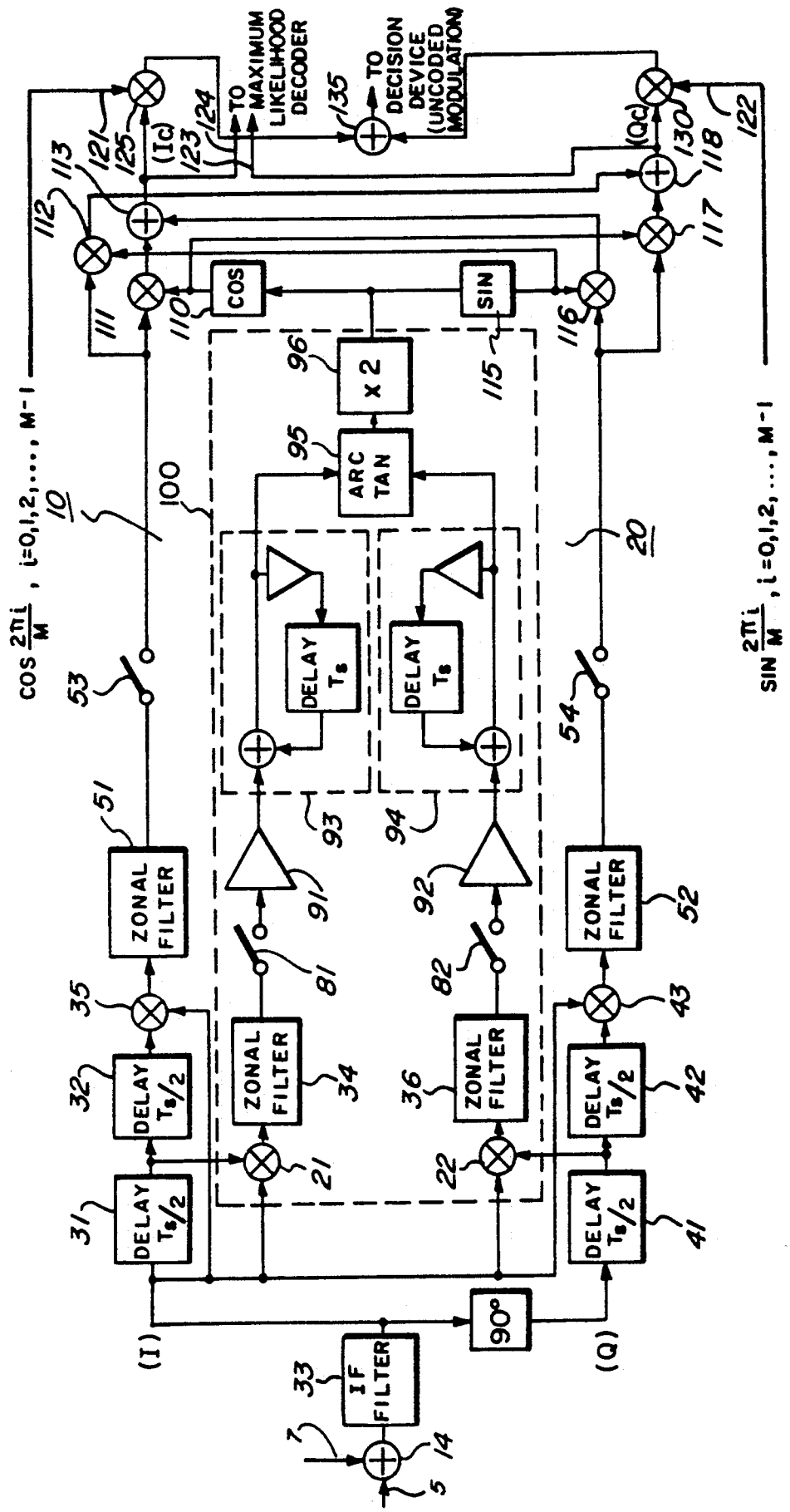
FIG. 3 depicts an I-F implementation of the invention of FIG. 2.

A more detailed and rigorous description of the invention is now presented with reference to FIG. 3. In FIG. 3, the Doppler-contaminated input signal s(t) is shown at input terminal 5. That signal is defined as:

$$s(t) = \sqrt{2P} \sin[(\omega_0 + \Delta\omega)t + \theta(t)] \quad (1)$$

where $\omega_0$ is the carrier, and $\Delta\omega$ the Doppler shift and $\theta(t)$ is the data modulated phase information in the form of a predetermined angle shift and some arbitrary phase shift that may be neglected. The input signal will also contain Gaussian noise n(t) at lead 7, which noise is defined as:

$$n(t) = \sqrt{2} \{n_c(t) \cos(\omega_0 + \Delta\omega)t + n_s(t) \sin(\omega_0 + \Delta w)t\} \quad (2)$$

where P denotes the average signal power in watts, $\Delta\omega = 2\pi\theta f$ is the radian Doppler shift, 8(t) is MPSK modulation with symbol rate $1/T_s$, and $n_c(t)$, $n_s(t)$ are low-pass Gaussian noise processes with one-sided power spectral density $N_0$ w/Hz.

Input leads 5 and 7 are connected to summing junction 14, which junction, in turn, is connected to a band pass IF filter 33 which functions to limit the noise in the summed signal. After passing the sum of s(t) and n(t) through the IF filter 33 (which for simplicity of analysis is assumed not to distort s(t)), the resulting signal, y(t), is then processed in parallel by the in-phase (I) and quadrature phase (Q) channels 10 and 20. These two channels produce signals suitable for data detection and Doppler estimation in accordance with the present invention.

In the Doppler estimation circuit 100 of the receiver, the in-phase and quadrature input components (delayed $T_s/2$ by delay circuits 31, 41) are multiplied at multipliers 21, 22 with the undelayed input itself. After zonal filtering by IF filters 34, 36 the second harmonic of the carrier has been removed, leaving the following signal:

$$x_c(t) = y(t)y(t - T_s/2) \tag{3}$$
$$= P \cos [(\omega_0 + \Delta\omega)T_s/2 + \theta(t) - \theta(t - T_s/2)] + N_c(t)$$
$$x_s(t) = y(t)y_{90}(t - T_s/2)$$
$$= P \sin [(\omega_0 + \Delta\omega)T_s/2 + \theta(t) - \theta(t - T_s/2)] + N_s(t)$$

where $$N_c(t) = n(t)s(t - T_s/2) + n(t - T_s/2)s(t) + n(t)n(t - T_s/2) \tag{4}$$
$$N_s(t) = n(t)s_{90}(t - T_s/2) + n_{90}(t - T_s/2)s(t) + n(t)n_{90}(t - T_s/2)$$

In the above equations (3) and (4) $N_c(t)$ and $N_s(t)$ are noise terms, and the subscript 90 refers to a 90° phase shift in the signal having that subscript. Making the assumption, as is typical in differential detection analyses, that $\omega_0 T_s/2$ is an integer multiple of $2\pi$, then Equation (3) may be simplified to $$x_c(t) = P \cos [\Delta\omega T_s/2 + \theta(t) - \theta(t - T_s/2)] + N_c(t) \tag{5}$$
$$x_s(t) = P \sin [\Delta\omega T_s/2 + \theta(t) - \theta(t - T_s/2)] + N_s(t)$$

Since the MPSK modulation $\theta(t)$ is constant over a symbol time, then $\theta(t) - \theta(t - T_s/2) = 0$ in the latter half of every symbol interval.

In FIG. 3, switches 81, 82 denote time sampling by any conventionally well-known sampling circuits. If we sample $x_c(t)$ and $x_s(t)$ at $t_k = [(4k+3)/4]T_s$, when k is equal to 1,2, 3 etc., then these sample values denoted by $x_{ck}$ and $x_{sk}$, respectively, become $$x_{ck} = P \cos \Delta\omega T_s/2 + N_{ck} \tag{6}$$
$$x_{sk} = P \sin \Delta\omega T_s/2 + N_{sk}$$

The signals $x_{ck}$ and $x_{sk}$ are sampled by switches 81, 82 respectively and these samples are amplified by gain circuits 91, 92 each of which provide a gain term of $1-\alpha$. Equation 6 shows that the data term has disappeared and we are left with the Doppler estimation signal. Finally, filtering each sample sequence to reduce undesired phase noise, an estimate $\Delta\hat{\omega}T_s$ of the normalized Doppler $\Delta\omega T_s$ can be obtained. The required filtering is performed using digital filters 93, 94 with gain coefficient $\alpha$ $(0 < \alpha < 1)$. In such a case, the Doppler estimate, $\Delta\hat{\omega}T_\delta$, is given by $$\Delta\hat{\omega}T_s = 2 \tan^{-1} \left( \frac{(1-\alpha)\sum_{k=0}^{\infty} \alpha^k x_{s,i-k}}{(1-\alpha)\sum_{k=0}^{\infty} \alpha^k x_{c,i-k}} \right) \tag{7}$$

Taking the sine and cosine of this estimate, namely, $$y_c = \cos \Delta\hat{\omega}T_s \tag{8}$$

$$y_s = \sin \Delta\hat{\omega}T_s$$

gives a pair of quadrature signals that can be further processed and used to remove the Doppler content from the in-phase and quadrature data detection channels, 10, 20 respectively. Before describing that removal, however, the data detection portion of the system will be described in further detail.

Figure 10:
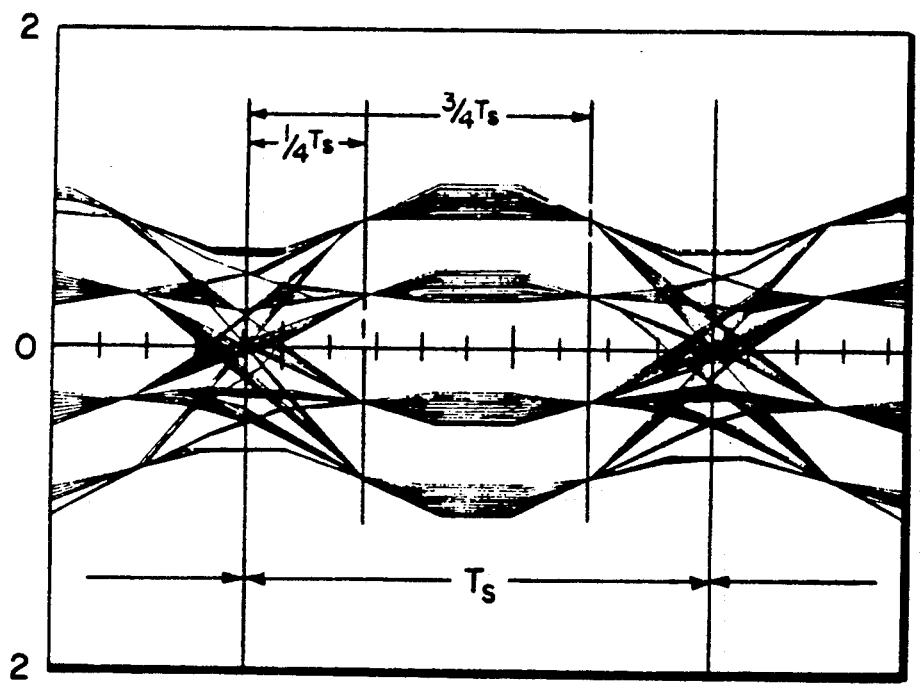
FIG. 10 is an eye diagram that shows sample points for zero intersymbol interference for the system of FIG. 9.

In the data detection portion of the receiver, the in-phase and quadrature input components (delayed by $T_s$ via circuits 31, 32 and 41, 42) are correlated with the input itself to produce (after zonal filtering in circuits 51, 52)

$$x_c'(t) = y(t)y(t - T_s) \tag{9}$$
$$= P \cos [\Delta\omega T_s + \theta(t) - \theta(t - T_s)] + N_c'(t)$$
$$x_s'(t) = y(t)y_{90}(t - T_s)$$
$$= P \sin [\Delta\omega T_s + \theta(t) - \theta(t - T_s)] + N_s'(t)$$

where $$N_c'(t) = n(t)s(t - T_s) + n(t - T_s)s(t) + n(t)n(t - T_s) \tag{10}$$
$$N_s'(t) = n(t)s_{90}(t - T_s) + n_{90}(t - T_s)s(t) + n(t)n_{90}(t - T_s)$$

and, in accordance with out previous assumption, we have made use of the fact that $\Delta\omega T_s$ is an integer multiple of $2\pi$. Switches 53, 54 are used to sample $x_c(t)$ and $x_s(t)$ at $t_k = [(2k-1)/2]T_s$ (i.e., the midpoints of the symbol intervals). See FIG. 10 for the location of midpoint sampling.

We obtain corresponding noise free sample values of $$x_{ck}' = P \cos (\Delta\omega T_s + \Delta\theta_k) + N_{ck}' \tag{11}$$

$$x_{sk}' = P \sin (\Delta\omega T_s + \Delta\theta_k) + N_{sk}'$$

where $\Delta\theta_k \underline{\underline{\Delta}} \theta_{k-1}$ is the kth data symbol phase before differential encoding at the transmitter, $\Delta\omega$ is the undesired Doppler term, and $N'_{ck}$ and $N'_{sk}$ are input noise terms. The noise free sample value signals at the output of switches 53 and 54 are respectively applied as one input signal each to multiplier junctions 111 and 116. These junctions 111, 116 also receive additional input signals as processed by Doppler estimator circuit 100.

Proper detection of $\Delta\theta_k$ requires removal of the Doppler from the signals in equation (11). The term $T_s/2$ is a tangent ratio, as is seen by an examination of equation (6), and thus we use an arc tangent circuit 95 of any well-known type connected to the outputs of digital filters 93, 94. Multiplier circuit 96 multiplies the input thereto by a factor of 2 to produce the estimate $\Delta\hat{\omega}T_s$ rather than $\Delta\hat{\omega}T_s/2$. The quadrature Doppler estimate signals of equation (8) are cross-correlated by circuits 110, 117 and 115, 112. These cross-correlated signals are processed in the form:

$$z_{ck} = x_{ck}'y_c + x_{sk}'y_s \quad (12)$$
$$= P\cos[(\Delta\hat{\omega} - \Delta\hat{\omega})T_s + \Delta\theta_k] + N_{ck}'\cos\Delta\hat{\omega}T_s + N_{sk}'\sin\Delta\hat{\omega}T_s$$
$$z_{sk} = x_{sk}'y_c - x_{ck}'y_s$$
$$= P\sin[(\Delta\omega - \Delta\hat{\omega})T_s + \Delta\theta_k] + N_{sk}'\cos\Delta\hat{\omega}T_s - N_{sk}'\sin\Delta\hat{\omega}T_s$$

Finally, the decision variable is determined by weighting $z_{ck}$ and $z_{sk}$ with the quadrature coordinate projections of any of the possible data symbol phases and summing the result to produce $$\gamma_i = z_{ck}\cos\frac{2\pi i}{M} + z_{sk}\sin\frac{2\pi i}{M}$$
$$= P\cos\left[(\Delta\omega - \Delta\hat{\omega})T_s + \left(\Delta\theta_k - \frac{2\pi i}{M}\right)\right] +$$
$$N_{ck}'\cos\left(\Delta\hat{\omega}T_s + \frac{2\pi i}{M}\right) + N_{sk}'\sin\left(\Delta\hat{\omega}T_s + \frac{2\pi i}{M}\right);$$
$$i = 0, 1, \ldots, M-1$$

which then goes to a decision device. If the modulation is coded, then the Doppler-corrected signals $I_c$ and $Q_c$ would be input to a maximum-likelihood decoder over leads 123, 124. Multipliers 125 and 130 receive the cosine and sine of the various possible phase angles that are available in the coding format. These reference phasors for the decision making process are applied to leads 121 and 122 connected to an input of multipliers 125 and 130. Component 135 is a summer for summing the two outputs of multipliers 125 and 130. Summer 135 is connected to a decision device as is shown which selects the phase angle that is closest to the various reference angles.

Figure 4:
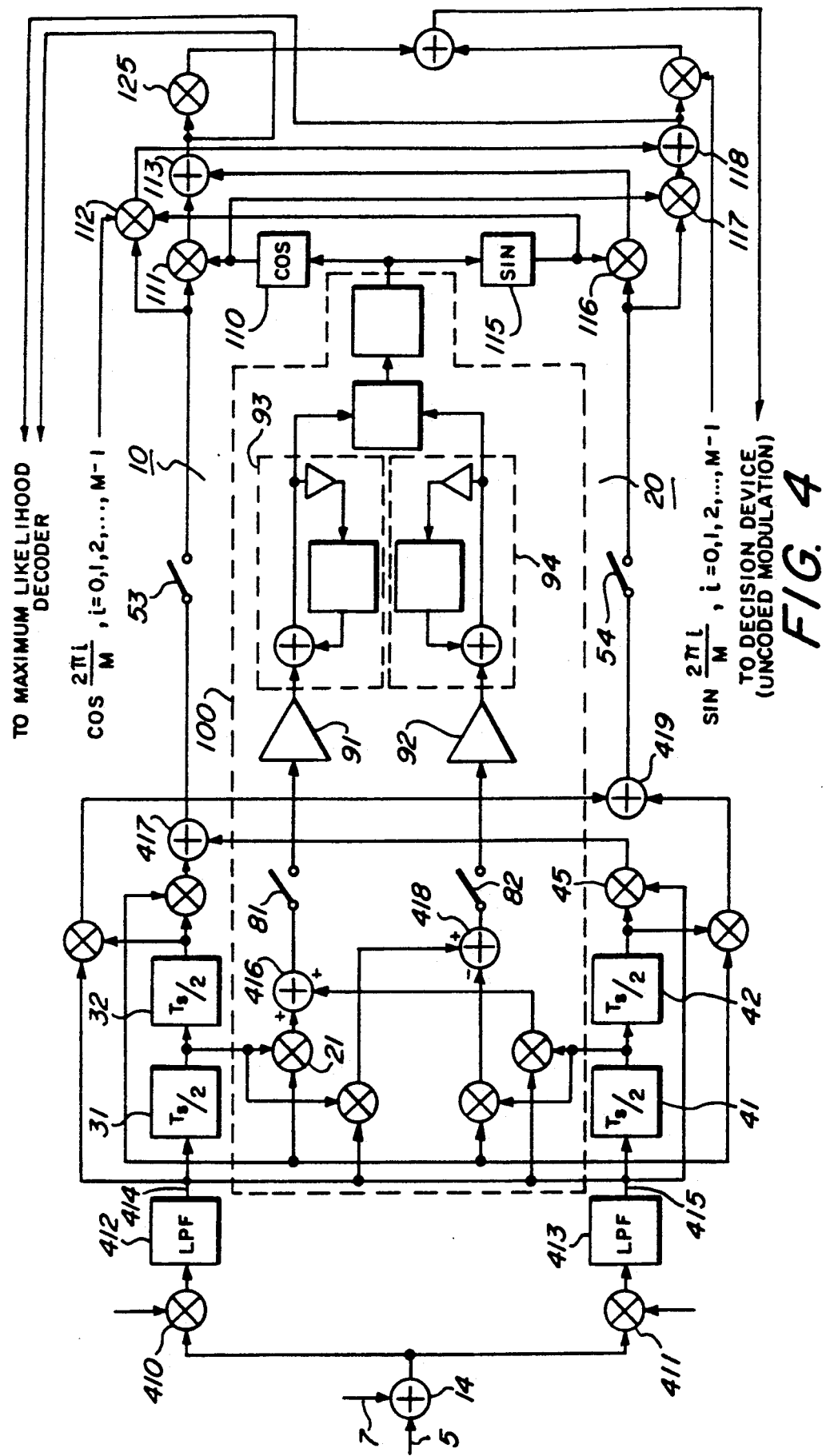
FIG. 4 depicts a baseband implementation of the invention of FIG. 2.

FIG. 4 is a baseband implementation of the invention. The primary differences between the IF and baseband implementations (FIGS. 3 and 4, respectively with like numerals designating like components and functions) is described as follows. In the IF operation signals are delayed and multiplied (31, 32, 28 and 41, 42, 29) at the carrier frequency producing sum and difference terms. The difference terms represent the desired signals which contain either the Doppler alone (Eqs. (5) and (6)) or the sum of the data and Doppler (Eq. (9)). The sum terms represent second harmonics of the carrier and are removed by the zonal filters 34 and 36 in FIG. 3. In the baseband operation, the carrier is first removed from the input by the in-phase (I) and quadrature (Q) demodulators 410 and 411 in FIG. 4 which demodulators receive the sine and cosine terms of a carrier in conventional operation. The demodulation once again produces sum and difference terms. The sum terms (appearing at leads 114 and 115 at the output of filters 412, 413) are processed using delay and multiply operations to produce the desired signals needed for data detection and Doppler estimation. One difference, however, is that here, in the baseband configuration, we must sum (at 416, 417, 418 and 419) the I x $I_T$ and I x $Q_T$ signals with the Q x $Q_T$ and Q x $I_T$ signals respectively, to yield the proper signals. (The subscript "T" denotes a $T_s$-sec or $T_s/2$-sec. delayed version of the respective signal as appropriate). In the IF configuration, the required signals are formed from the I x $I_T$ and I x $Q_T$ signals alone. This difference is a consequence of multiplying baseband signals rather than IF signals and is common to all baseband and IF equivalent circuitry. FIG. 4 requires no further discussion because it uses the features and principles described in connection with FIG. 3 hereinbefore.

PERFORMANCE OF THE DOPPLER ESTIMATOR

To assess the performance of the Doppler estimator 100 operating in accordance with this invention as defined in equation (7), we must characterize the statistical properties of the noise samples $N_{ck}$ and $N_{sk}$. Using terms (1) and (2) in equation (4), it is straightforward to show that $$N_{ck} = A_{ck}\cos\Delta\omega T_s/2 - A_{sk}\sin\Delta\omega T_s/2 \quad (14)$$
$$N_{sk} = A_{ck}\sin\Delta\omega T_s/2 + A_{sk}\cos\Delta\omega T_s/2$$

where $A_{ck}$ and $A_{sk}$ are, respectively, samples (at $t_k = [(4k+3)/4]T_s$) of $A_c(t)$ and $A_s(t)$ defined by $$A_c(t) = \sqrt{P}\, n_c(t)\sin\theta(t - T_s/2) + \quad (15a)$$
$$\sqrt{P}\, n_s(t)\cos\theta(t - T_s/2) + \sqrt{P}\, n_c(t - T_s/2)\sin\theta(t) +$$
$$\sqrt{P}\, n_s(t - T_s/2)\cos\theta(t) + n_c(t)n_c(t - T_s/2) + n_s(t)n_s(t - T_s/2)$$

and $$A_s(t) = \sqrt{P}\, n_c(t)\cos\theta(t - T_s/2) - \sqrt{P}\, n_s(t)\sin\theta(t - T_s/2) - \quad (15b)$$
$$\sqrt{P}\, n_c(t - T_s/2)\cos\theta(t) + \sqrt{P}\, n_s(t - T_s/2)\sin\theta(t) +$$
$$n_c(t)n_s(t - T_s/2) - n_s(t)n_c(t - T_s/2)$$

The non-Gaussian orthogonal components $A_{ck}$ and $A_{sk}$ are uncorrelated. Furthermore, $B_{ck}$ and $A_{ck}$ both have zero mean and variance $$\sigma^2 = PN_0B\left(1 + \frac{N_0B}{2P}\right) \quad (16)$$

where B is the input IF filter bandwidth.

Using (14) in (6) and applying straightforward trigonometric operations, we can write (7) in the normalized form $$\Delta\hat{\omega}T_s - \Delta\omega T_s = 2\tan^{-1}\left(\frac{\xi}{\sqrt{2\rho} + \zeta}\right) = \Delta\Phi \quad (17)$$

where $$\xi = \sqrt{1-\alpha^2}\sum_{k=0}^{\infty}\alpha^k\frac{A_{s,i-k}}{\sigma}\,;\; E\{\xi\} = 0,\, \sigma_\xi^2 = 1 \quad (18)$$
$$\zeta = \sqrt{1-\alpha^2}\sum_{k=0}^{\infty}\alpha^k\frac{A_{c,i-k}}{\sigma}\,;\; E\{\zeta\} = 0,\, \sigma_\zeta^2 = 1$$

-continued $$\rho = \frac{P^2 K_\alpha}{2\sigma^2} = \left(\frac{PK_\alpha}{2N_0B}\right)\left[1 + \frac{N_0B}{2P}\right]^{-1} ; K_\alpha = \frac{1+\alpha}{1-\alpha}$$

Thus, $\Delta\hat{\omega}T_s$ is an unbiased estimator of $\Delta\dot{\omega}T_s$.

Making the practical assumption that $K_\alpha$ is large actually a value of $K_\alpha = 10$ is sufficient) and applying central limit therorem-type arguments, then $\xi$ and $\zeta$ are approximately Gaussian distributed. Under this condition, the probability density function of $\nu \Delta \Delta \Phi/2 = (\Delta\omega - \Delta\hat{\omega})T_s/2$ is given by $$p_\nu(\nu) = \frac{\exp(-\rho)}{2\pi} + \tag{19}$$

$$\frac{1}{2}\sqrt{\frac{\rho}{\pi}} \exp(-\rho \sin^2 \nu) \cos \nu [1 + \text{erf}(\sqrt{\rho} \cos \nu)]; |\nu| \leq \pi$$

The variance of the estimator can be computed from the second moment of (19) which for $K_a$ large becomes $$\sigma^2_{\Delta\hat{\omega}T_s} = \frac{4}{K_\alpha\left(\frac{P}{N_0B}\right)}\left(1 + \frac{N_0B}{2P}\right) \tag{20}$$

This same result can be obtained directly by following an approach analogous to that taken in A. J. Viterbi, and A. M. Viterbi, "Nonlinear Estimation of PSK-Modulated Carrier Phase with Application to Burst Digital Transmission," IEEE Transactions on Information Theory, Vol. IT-29, No. 4, July 1983, pp. 543–551.

EVALUATION OF THE AVERAGE SYMBOL ERROR PROBABILITY

In R. F. Pawula, S. O. Rice, and J. H. Roberts, "Distribution of the Phase Angle Between Two Vectors Perturbed by Gaussian Noise," IEEE Transactions on Communications, Vol. COM-30, No. 8, August 1982, pp. 1828–1841, it was shown that for uncoded "ideal" (no Doppler) MDPSK, the average symbol error probability is given by $$P_s = \frac{\sin\frac{\pi}{M}}{\pi} \int_0^{\pi/2} \frac{\exp\left[-\frac{E_s}{N_0}\left(1 - \cos\frac{\pi}{M}\cos\alpha\right)\right]}{1 - \cos\frac{\pi}{M}\cos\alpha} d\alpha \tag{21}$$

where $E_s = (\log_2 M)E_b$ is the energy per symbol with $E_b$ the bit energy.

When Doppler is present, which results in a noisy phase $\Delta\Phi = (\Delta\hat{\omega} - \Delta\omega)T_s$ being added to the decision variable [see (13)], then using Eqs. (11) and (43) of the above-noted Pawula et al. article, equation (21) is modified to $$P_s(\Delta\Phi) = \frac{\sin\left(\frac{\pi}{M} - \Delta\Phi\right)}{4\pi} \int_{-\frac{\pi}{2}}^{\frac{\pi}{2}} \frac{\exp\left[-\frac{E_s}{N_0}\left(1 - \cos\left(\frac{\pi}{M} - \Delta\Phi\right)\cos\alpha\right)\right]}{1 - \cos\left(\frac{\pi}{M} - \Delta\Phi\right)\cos\alpha} d\alpha +$$

$$\frac{\sin\left(\frac{\pi}{M} + \Delta\Phi\right)}{4\pi} \int_{-\frac{\pi}{2}}^{\frac{\pi}{2}} \frac{\exp\left[-\frac{E_s}{N_0}\left(1 - \cos\left(\frac{\pi}{M} + \Delta\Phi\right)\cos\alpha\right)\right]}{1 - \cos\left(\frac{\pi}{M} + \Delta\Phi\right)\cos\alpha} d\alpha \tag{22}$$

which for $\Delta\Phi = 0$ reduces to (21). Averaging (22) over the probability density function of $\Delta\Phi$ gives the average symbol error probability performance of the Doppler-corrected differential detector, namely, $$P_s = \int_{-2\pi}^{2\pi} P_s(\Delta\Phi)p_{\Delta\Phi}(\Delta\Phi)d\Delta\Phi = 2\int_0^\pi P_s(2\nu)p_\nu(\nu)d\nu \tag{23}$$

where $P_\nu(\nu)$ is given by (19)

EVALUATION OF THE AVERAGE BIT ERROR PROBABILITY

To evaluate the average bit error probability, we follow the procedure derived by Lee in "Computation of the Bit Error Rate of Coherent Mary PSK with Gray Code Bit Mapping," IEEE Transactions on Communications, Vol. COM-34, No. 5, May 1986, pp. 488–490 for ideal MPSK and MDPSK and extend it to the case where a noisy phase is added to the decision variable. In particular, we define $$A_i(\Delta\Phi) = \frac{\sin\left(\Delta\Phi - (2i+1)\frac{\pi}{M}\right)}{4\pi} \times \int_{-\frac{\pi}{2}}^{\frac{\pi}{2}} \frac{\exp\left[-\frac{E_s}{N_0}\left(1 - \cos\left(\Delta\Phi - (2i+1)\frac{\pi}{M}\right)\cos\alpha\right)\right]}{1 - \cos\left(\Delta\Phi - (2i+1)\frac{\pi}{M}\right)\cos\alpha} d\alpha -$$

$$\frac{\sin\left(\Delta\Phi - (2i+1)\frac{\pi}{M}\right)}{4\pi} \times \int_{-\frac{\pi}{2}}^{\frac{\pi}{2}} \frac{\exp\left[-\frac{E_s}{N_0}\left(1 - \cos\left(\Delta\Phi - (2i-1)\frac{\pi}{M}\right)\cos\alpha\right)\right]}{1 - \cos\left(\Delta\Phi - (2i-1)\frac{\pi}{M}\right)\cos\alpha} d\alpha \tag{24}$$

which represents the probability that the detector output phase is in the region $[(2i-1)/M, (2i+1)/M]$ under the hypothesis that the input phase $\Delta\theta_k = 0$. Then, the conditional symbol error probability of (22) can be expressed as $$P_s(\Delta\Phi) = \sum_{i=1}^{M-1} A_i(\Delta\Phi) \tag{25}$$

and assuming a Gray code bit assignment with Hamming weights $w_m$, the conditional bit error probability is given by $$P_b(\Delta\Phi) = \frac{1}{\log_2 M} \sum_{m=1}^{M-1} w_m A_m(\Delta\Phi) \tag{26}$$

Here $w_m$ represents the number of bit errors that occur if the detector output phase lies in the region corresponding to $A_m(\Delta\Phi)$.

Recognizing from (24) that $A_{M-i}(\Delta\Phi) = A_i(-\Delta\Phi)$, and since $P_{\Delta\Phi}(\Delta\Phi)$ is a symmetric probability density function then $\overline{A_{M-i}} = \overline{A_i}$ where the overbar denotes averaging over $P_{\Delta\Phi}(\Delta\Phi)$. Hence, when the same average is performed on (25) and (26), we get $$P_s = 2 \sum_{m=1}^{M/2} \overline{A_m} - \overline{A_{M/2}} \tag{27}$$

and $$P_b = \frac{1}{\log_2 M} \left[ \sum_{m=1}^{M/2} (w_m + w_{M-m}) \overline{A_m} - w_{M/2} \overline{A_{M/2}} \right] \tag{28}$$

Lee, in the above-cited article, showed that for $M=4$ and $M=8$, simple closed form expressions could be obtained for the bit error probability of ideal MDPSK. The analogous expressions for the case of corrected Doppler present are $$P_b = F\left(\frac{5\pi}{4}\right) - F\left(\frac{\pi}{4}\right) \quad (M=4) \tag{29}$$

and $$P_b = \frac{2}{3} \left[ F\left(\frac{13\pi}{8}\right) - F\left(\frac{\pi}{8}\right) \right] \quad (M=8) \tag{30}$$

where $$F(\psi) = \int_{-\pi}^{\pi} F(\psi, 2\nu) p_\nu(\nu) d\nu \tag{31}$$

with $$F(\psi,\beta) = \frac{\sin(\beta-\psi)}{4\pi} \int_{-\frac{\pi}{2}}^{\frac{\pi}{2}} \frac{\exp\left[-\frac{E_s}{N_0}(1-\cos(\beta-\psi)\cos\alpha)\right]}{1-\cos(\beta-\psi)\cos\alpha} d\alpha \tag{32}$$

For any fixed $\beta$, $F(\psi, \beta)$ is easily evaluated using a Gauss-Chebyshev formula. In particular, $$I \overset{\Delta}{=} \int_{-\frac{\pi}{2}}^{\frac{\pi}{2}} f(\cos\alpha) d\alpha = 2 \int_0^{\frac{\pi}{2}} f(\cos\alpha) d\alpha$$

$$= \int_0^\pi f\left(\cos\frac{\eta}{2}\right) d\eta = \int_0^\pi f\left(\sqrt{\frac{1+\cos\eta}{2}}\right) d\eta \tag{33}$$

Letting $z = \cos\eta$, then $$I = \int_{-1}^1 \frac{f\left(\sqrt{\frac{1+z}{2}}\right)}{\sqrt{1-z^2}} dz$$

$$\cong \frac{\pi}{N} \sum_{k=1}^N f\left(\sqrt{\frac{1+z_k}{2}}\right) \tag{34}$$

where N is chosen large enough to give the amount of accuracy desired and $$z_k = \cos\left(\frac{(2k-1)\pi}{2N}\right); k = 1, 2, \ldots, N \tag{35}$$

i.e., the zeros of the Nth degree Chebyshev polynomial $T_N(x) = \cos(N\cos^{-1}x)$.

Similarly $\overline{F(\psi)}$ of (31) can also be evaluated using a Gauss-Chebyshev formula. First breaking the integral on $(-\pi, \pi)$ into two integrals, one on $(-\pi, 0)$ and one on $(0, \pi)$, and then using double angle trigonometric identities, we arrive at the desired result, namely, $$\overline{F(\psi)} = \frac{\pi}{N} \sum_{l=1}^N g(z_l) \tag{36}$$

where $Z_l$ is given by (35) with the index k replaced by l, and $$g(z) = p_z(z)[F_+(\psi,z) + F_-(\psi,z)] \tag{37}$$

with $P_z(z)$ obtained by replacing $\cos \nu$ with z in (19) and $$F_\pm(\psi,z) = \frac{\pm(2z\sqrt{1-z^2})\cos\psi - (2z^2-1)\sin\psi}{4\pi} \times \tag{38}$$

$$\frac{\pi}{N} \sum_{k=1}^{N} \frac{\exp\left(-\frac{E_s}{N_0}\left(1 - [(2z^2-1)\cos\psi \pm (2z\sqrt{1-z^2})\sin\psi]\sqrt{\frac{1+z_k}{2}}\right)\right)}{1 - [(2z^2-1)\cos\psi \pm (2z\sqrt{1-z^2})\sin\psi]\sqrt{\frac{1+z_k}{2}}}$$

Figure 5:
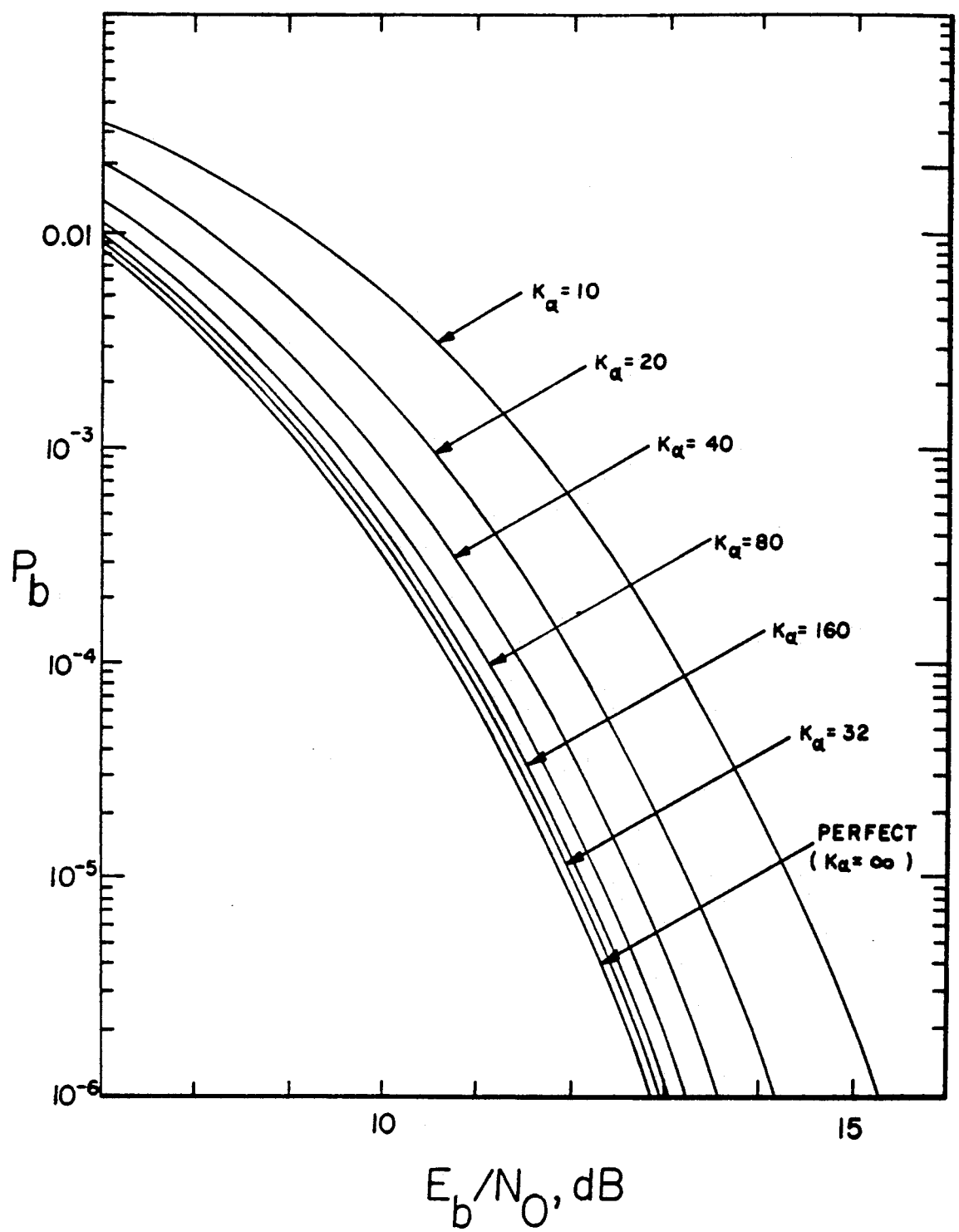
FIG. 5 is a set of curves useful in demonstrating the performance of the invention.
Figure 6:
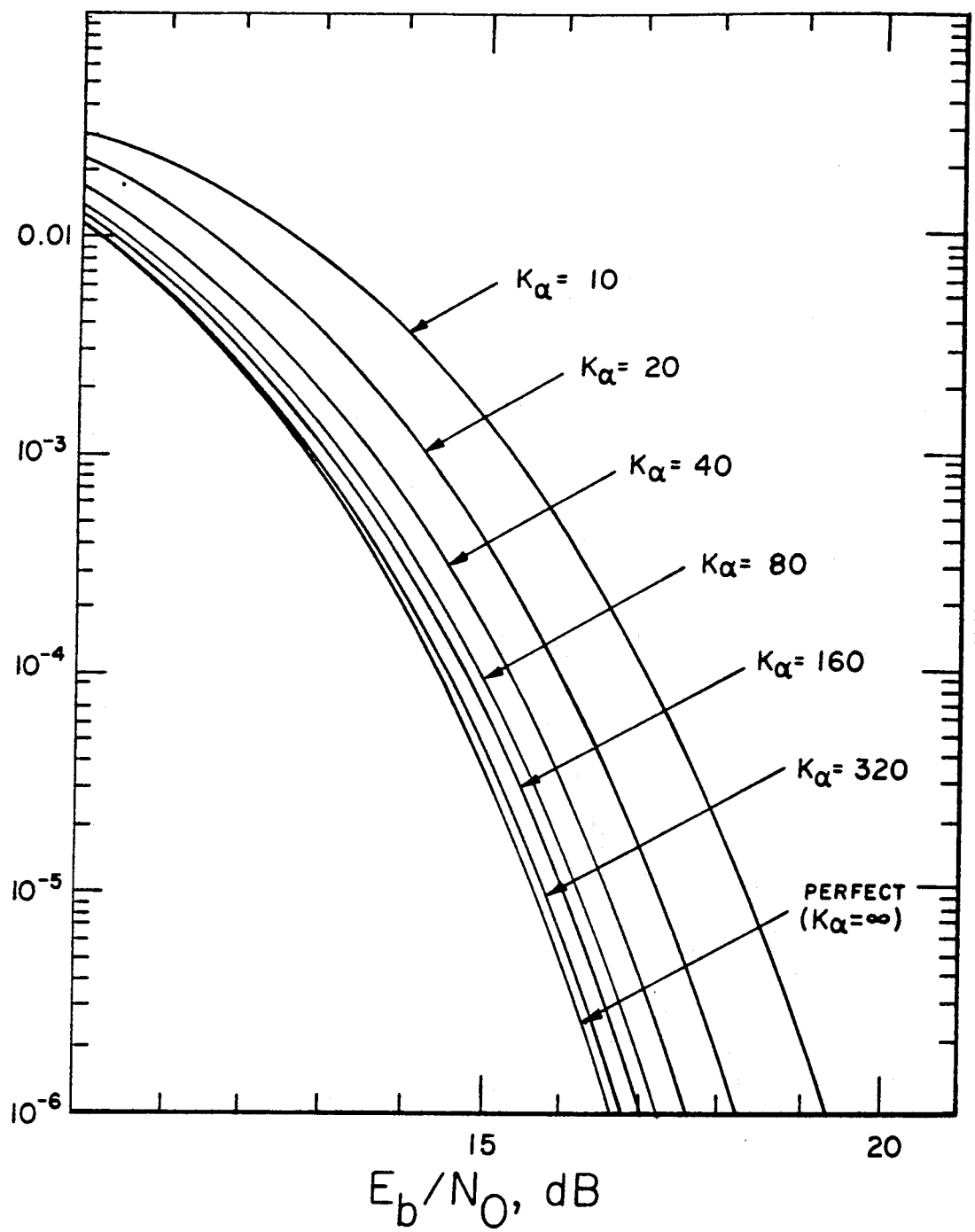
FIG. 6 is another set of curves also useful for demonstrating the invention's performance.

Illustrated in FIGS. 5 and 6 are the average bit error probability performances of 4DPSK and 8DPSK as a function of bit energy-to-noise ratio, $E_b/N_O$, in dB with $K_\alpha$ as a parameter. These numerical results were obtained from equations (29) and (30), respectively. For the purpose of comparison, the bit error probability performance for perfect Doppler compensation (i.e., $K_\alpha = \infty$) is also illustrated in these figures. It should be observed that to achieve about 0.5 dB requires a value of K on the order of eighty (80). This seemingly high value of K comes from the fact that the Doppler estimate must be multiplied by 2 (see the multiplier 96 in FIGS. 3 and 4) before using that estimate to remove the Doppler from the data detection signals. This, unfortunately, increases the variance of the estimator by a factor of 4 (see Eq. (20)). The requirement for multiplying the Doppler estimate by a factor of 2 is tied to the fact that within a given symbol interval, the change in phase over half a symbol interval is independent of the data symbol itself and contains only the Doppler induced phase shift, thus allowing its estimation.

PRACTICAL CONSIDERATIONS

In bandlimited applications, the rectangular baseband pulses assumed thus far should be shaped to limit adjacent channel interference (ACI) and control intersymbol interference (ISI). Since $\theta(t)$ is no longer constant over a symbol time, then in order to still achieve $x_{ck}$ and $x_{sk}$ of the form in (6), i.e., I and Q Doppler estimation samples which are independent of the data modulation, we must impose a requirement on the pulse shaping such that $$\hat{\theta}((k+\tfrac{3}{4})T_s) - \hat{\theta}((k+\tfrac{1}{4})T_s) = 0 \qquad (39)$$

where $\hat{\theta}(t)$ is the filtered version of $\theta(t)$. Equivalently, we require a pulse shaping such that $$\sin\hat{\theta}((k+\tfrac{3}{4})T_s) = \sin\hat{\theta}((k+\tfrac{1}{4})T_s) \qquad (40)$$

$$\cos\hat{\theta}((k+\tfrac{3}{4})T_s) = \cos\hat{\theta}((k+\tfrac{1}{4})T_s)$$

Assuming that one chooses a pulse shaping to satisfy (40), then, in general, the samples taken at $t = (k+1/2)T_s$ (i.e., the midpoints of the symbol interval for data detection purposes will be subject to ISI. Thus, the question may arise: Can we choose a pulse shaping that satisfies (39) yet still allows data detection without any penalty due to ISI? This question has a fortuitous answer which depends on applying ingenuity which relates to additional features of the invention.

We shall show by reference to equations depicted and described relative to FIG. 11 (described in additional detail in Appendix A hereinafter) that we can obtain the characteristics of a 100% raised cosine system by splitting this overall transmission characteristic into a 100% root raised cosine filter 1100 at the transmitter and an ideal low pass filter 1110 at the receiver combined with two summed samples (1120, 1125, 1130, 1135) prior to demodulation. THe samples are taken one-half symbol interval apart at one-quarter and three-quarter symbol times. The ideal low pass filter 1110 followed by two samples at $T_s/4$ (delayed by 1135) and $3T_s/4$ supplied to a summer 1130 yields an equivalent operation to a 100% root raised cosine filter.

Suppose that we consider an overall (transmitter plus receiver) pulse shaping of the 100% excess bandwidth root raised cosine type. Such pulse shaping is known and has a transfer characteristic of the form $$P(\omega) = P_T(\omega)P_R(\omega) = \begin{cases} T_s\cos\omega T_s/4; & |\omega| \le 2\pi/T_s \\ 0; & \text{otherwise} \end{cases} \qquad (41)$$

with a corresponding impulse response of $$p(t) = \frac{4}{\pi}\left[\frac{\cos 2\pi\frac{t}{T_s}}{1 - \left(\frac{4t}{T_s}\right)^2}\right] \qquad (42)$$

Since the zero crossings of p(t) occur at $t = \pm(2k+1)T_s/4; k=1, 2, 3, \ldots$, then if p(t) were used as the underlying pulse shape in a digital pulse train of the form $m(t) = \Sigma a_{np}(t-nT)$ with $\{a_n\}$ representing a multilevel data sequence, then m(t) taken at $t = (n+1/4)T_s$ and $(n+3/4)T_s$ would be ISI free and equal in amplitude. Thus, using such an m(t) for the I and Q data signals sin $\theta(t)$ and cos $\theta(t)$ allows (40) to be satisfied.

The question remains as to where to sample and how to process the I and Q data signals for data signals for data detection purposes. Since, as pointed above, samples of sin $\theta(t)$ and cos $\theta(t)$ taken at $t = (n+1/4)T_s$ and $(n+3/4)T_s$ are ISI free, then it seems reasonable to sum these two samples prior to differential detection. Since p(t) has value unity at these sample points, i.e., the same value as a unit rectangular pulse, then compared to a single sample of this rectangular (ISI free) pulse, the above sum yields a 6 dB increase in power of the predetection sample in the absence of noise.

Ordinarily from the standpoint of maximizing the SNR of a single sample of I or Q, one would split the total pulse shaping $P(\omega)$ equally between the transmit and receive filters with the filters at each location taking the form of a square root raised cosine characteristic. Note that from an overall system standpoint the filters multiply and thus yield an equivalent raised cosine system response. Such a split would result in the noise samples at $t = (n+1/4)T_s$ and $(n+3/4)T_s$ being correlated. Suppose instead that half of the filtering (square root raised cosine) is placed at the transmitter and a brick wall filter (ideal low pass) is used at the receiver. This results in a 3 dB penalty in the noise power of a single sample. However, it can be shown that noise samples separated by $T_s/2$ are now uncorrelated and hence the increase in noise power produced by summing the above two samples to produce a single pre-detection sample is 3 dB. Finally then, for the root raised cosine pulse shaping proposed above, the SNR of the pre-detection sample formed from the sum of samples taken at $t = (n + 1/4)T_s$ and $(n + 3/4)T_s$ is identical to that of a single sample of a rectangular pulse and thus there is no ISI penalty.

In fact, the above-noted result, which appears rather surprising at first, can be supported quite easily by showing that, in the absence of Doppler, the split filtering with an ideal low pass filter at the receiver is indeed the optimum filter split for Nyquist-type signaling with two nonzero uniform sample points (as is proved by Appendix A). In this context, the above scheme bears resemblance to the duobinary approach discussed earlier but is entirely binary and does not depend upon the three level complexity of the duobinary approach.

When Doppler is present, $G(\omega)$ of FIG. 12 is replaced by $$G(\omega - \Delta\omega) = 1 + \exp\{-j(\omega - \Delta\omega)T_s/2\} \qquad (43)$$
$$= 1 + a \exp\{-j\omega T_s/2\}; \quad a = \exp\{j\Delta\omega T_s/2\}$$

thus requiring knowledge of the Doppler frequency shift. What is used is the Doppler estimate $\Delta\hat{\omega}$ for $\Delta\omega$ in the implementation of equation (42) analogous to the use of $\Delta\hat{\omega}$ instead of $\Delta\omega$ for the final Doppler removal.

If the matched filter follows the differential detector, the circuit operation is once again $G(\omega)$ of FIG. 12. It should be noted that one could indeed also use a differential detector followed by the $G(\omega)$ combination for the data detection portion of the receiver in an effort to produce some commonality in structure. However, this later approach is suboptimum and leads to a degradation in output SNR. Also, in this case, the probability density function of the differential detector output (which is not Gaussian) is changed by the matched filter and hence, the bit error probability performance expressions of equations (24) through (28) are no longer valid.

One additional point, alluded to above, needs to be discussed. Since in the ACQ mode, the differential detector operates over a $T_s$ sec. interval, the output of the digital filter will proportional to $\exp\{-j\Delta\hat{\omega}T_s\}$ rather than $\exp\{-j\Delta\hat{\omega}T_s/2\}$ as in the tracking (TRK) mode where the differential detector operates over $T_s/2$ sec. Since implementation of the matched filter for data detection requires the complex quantity "a" of equation (42), then in the ACQ mode, one must take the square root of the digital filter output in order to make this quantity available. On the other hand, in the TRK mode, where "a" is directly available, then to achieve the quantity $\exp\{-j\Delta\omega T_s\}$ which is needed for Doppler removal, we square the digital filter output.

Figure 7:
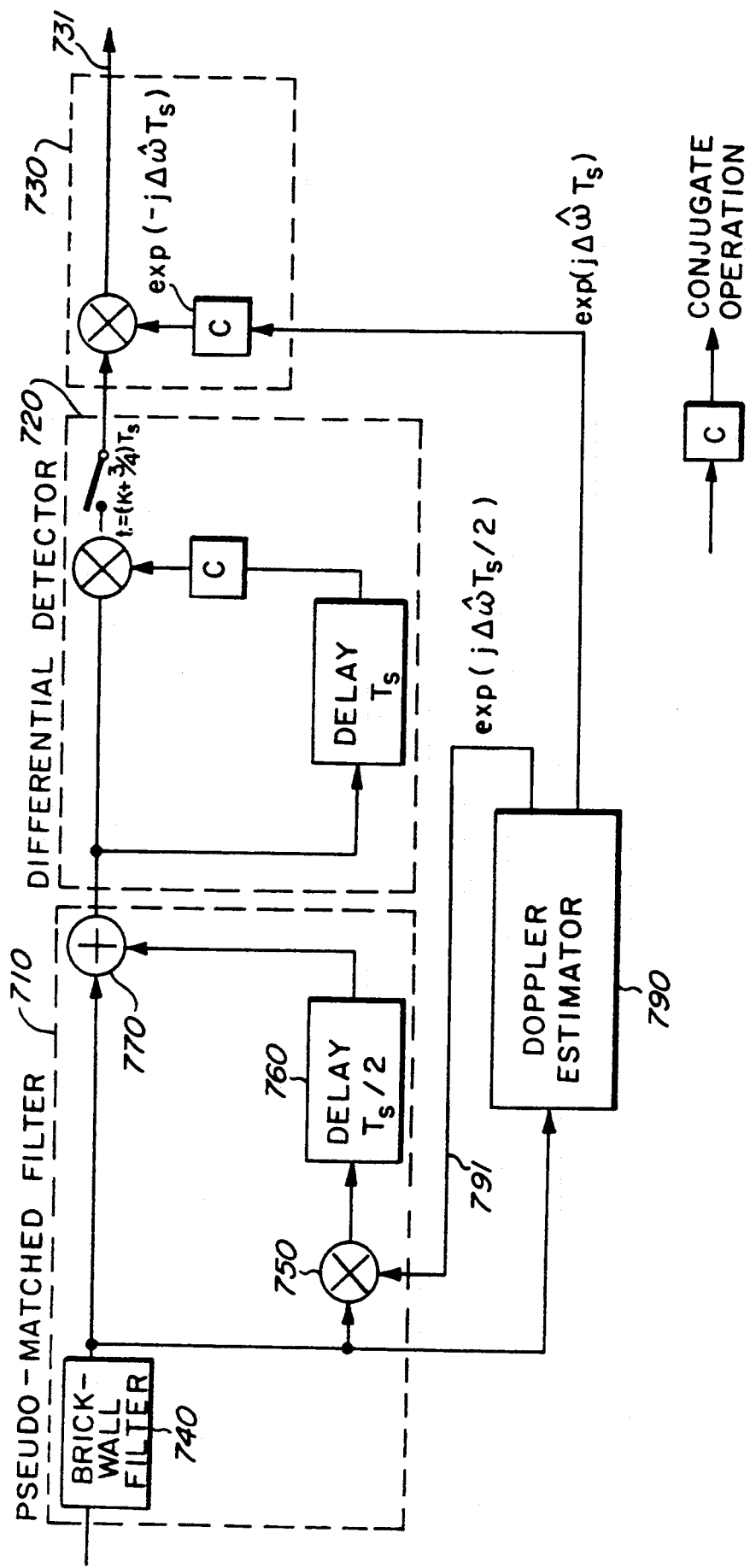
FIG. 7 is a simple building-block diagram depicting the Doppler-corrected receiver in complex form, in a tracking mode.

FIG. 7, described below, relates to differential detection with Doppler estimation. This FIG. 7 includes, in a practical implementation, the theory discussed above concerning data detection and Doppler correction. A review of equation 43 shows that if the Doppler amount is zero then the matched filter of FIG. 7 is in accordance with FIG. 12.

In FIG. 7, the box legend "C" represents a conjugate operation. Pseudo-matched filter 710 includes brickwall filter 740, multiplier 750, a half symbol delay 760 and a summer 770. Multiplier 750 requires two signals, (1) a filtered output signal from brickwall filter 740 and (2) an input signal in the form of the complex quantity $a = \exp(j \Delta\hat{\omega} T_s/2)$. The complex quantity $\exp(j \Delta\hat{\omega} T_s/2)$, obtained by Doppler estimator 790, is required for Doppler removal in the pseudo-matched filter prior to differential detection in detector 720. In the absence of Doppler, $a = 1$ and the pseudo-matched filter becomes a true matched filter, i.e., a root raised cosine filter. Furthermore, the bandwidth of the brickwall filter is narrowed to the symbol rate. Differential detector 720 of FIG. 7 operates in the manner described previously and requires no further discussion.

A practical implementation of the receiver of FIG. 7 requires an understanding and use of acquisition ("ACQ") and tracking ("TRK") modes which will be discussed in connection with additional figures such as FIGS. 7A through 7C. If $\Delta\hat{\omega} = \Delta\omega = 0$ and the bandwidth of the brickwall filter 740, FIG. 7, is equal to $1/T_s$ then filter 740 is exactly a matched filter for a root raised cosine filter with 100% excess bandwidth at the transmitter. If $\Delta\omega$ is not equal to zero then filter 740 represents a pseudo-matched filter (e.g., an approximately matched filter). The bandwidth of brickwall filter 740, in the presence of Doppler frequency shift, should be equal to $(1/T_s + f_d, \text{MAX})$.

Figure 7A:
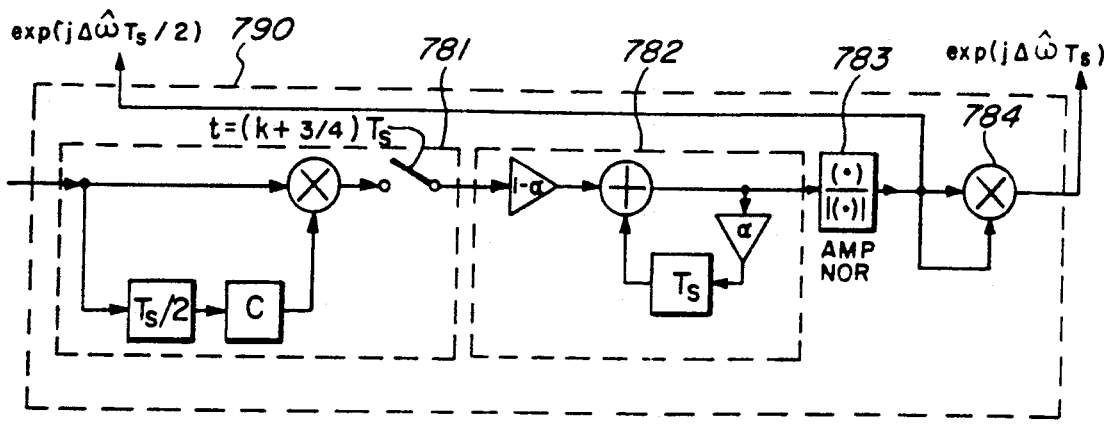
FIG. 7A supplies a more detailed form of the Doppler estimator of FIG. 7.

FIG. 7A presents additional details of the circuitry and operation of the Doppler estimator 790 shown simply as a block diagram in FIG. 7. A tracking mode for the Doppler estimator circuit 790 of FIG. 7A will be described. An output from the brickwall filter 740 is applied as an input signal to another differential detector 781 which operates in the manner previously described, i.e., that differential detector 781 of FIG. 7A differentially detects two samples within each full symbol interval. The samples are separated by $T_s/2$ in order to "wipe off" the data phase, and thus result in a complex signal of Doppler induced phase $T_s/2$. The sampled output from detector 781 is applied to a digital low pass filter 782. This digital low pass filter is comparable to those described earlier in connection with FIG. 3 and is employed to improve the estimate of the Doppler by removing the effect of noise on $\Delta\hat{\omega}T_s/2$. An amplitude normalizer 783 normalizes the envelope of digital filter output 782 to unity. This normalized output from 783 is provided both to the pseudo-matched filter 710, FIG. 7, and to a squaring circuit 784. A squared output from 784 is applied to the residual Doppler corrector 730, FIG. 7. As previously explained, the residual Doppler is removed at the output of 730 and the output signal on lead 731 contains only the differential detected phase data which is recovered in standard operation by differential detector 720, FIG. 7.

In many applications, Doppler estimation, such as that achieved by estimator 790, first takes place via a coarse Doppler estimate which is obtained in the presence of a known data sequence, e.g., all zeros. FIG. 7B depicts a fast acquisition circuit that is used when the data sequence is known to the receiver. Such preordained knowledge at the receiver is accomplished by having the transmitter send a constant phase for a short time in the order of about twenty symbols as a preamble to every data packet. Such a preamble results in a fast acquisition of the Doppler estimate. After that fast acquisition the receiver can switch to the tracking mode for open loop Doppler estimation where the data phase is not known by the receiver.

In the above-noted acquisition (ACQ) mode, the change in $\theta(t)$ is known (for the all zeros sequence, this change is indeed zero) and thus one would expect that the differential detector output samples could be used as inputs to a digital filter in the Doppler estimator. Unfortunately, as we have just pointed out above, the differential detector output samples are themselves functions of the Doppler estimate and thus implementing the system in the fashion would result in a feedback or closed loop system. Since one of the goals of our invention was to maintain a feedforward (open loop) configuration, we compromise a bit by reversing the order of matched filter and differential detector operations for the Doppler estimation portion of the receiver in the ACQ mode.

Figure 7B:
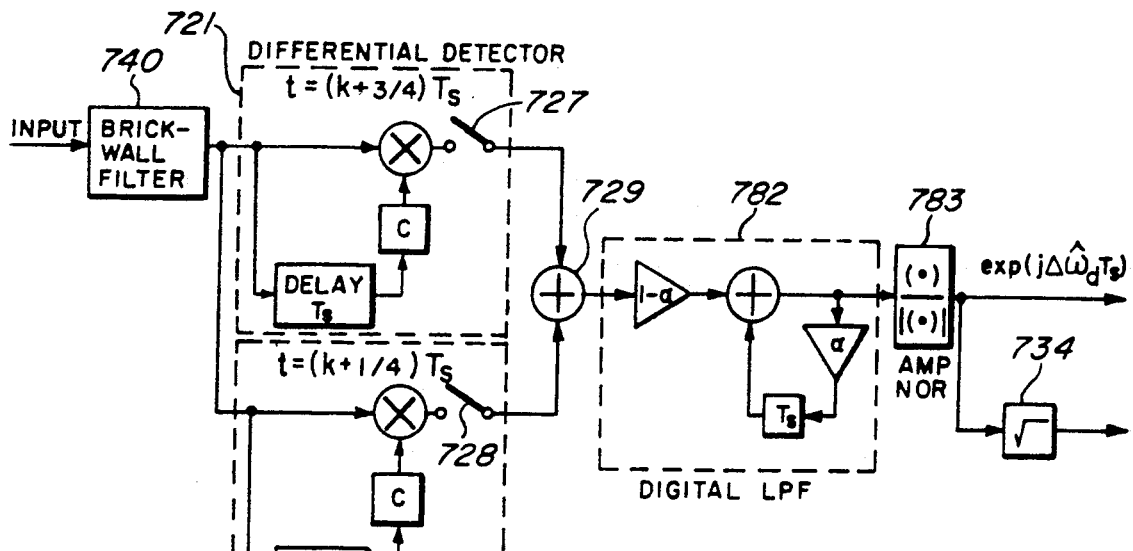
FIG. 7B depicts a fast acquisition circuit for Doppler correction.

Again in FIG. 7B, the brickwall filter 740 is used to noise limit and has a bandwidth that is equal to the symbol rate is Hertz plus the maximum frequency shift that is to be expected. A pair of differential detectors 721 and 722, operating as previously described, include switches 727 and 728 to obtain two samples during each symbol interval. THe noise in these samples at $1/4T_s$ and $3/4T_s$ is independent of each other but both include the same Doppler-induced phase. Accordingly, adding these samples in summer 729 enhances the signal-to-noise ratio by approximately 3 dB as explained earlier. The complex signal at the output of summer 729 includes a noisy version of the Doppler-induced phase and the version is passed through a digital filter 782 and a normalizer 783. Two output signals are developed. One output signal is the $\exp(j\Delta\hat{\omega}T_s)$ term and the other output signal is fed through a square root circuit 734, producing $\exp(j\Delta\hat{\omega}T_s/2)$.

Figure 7C:
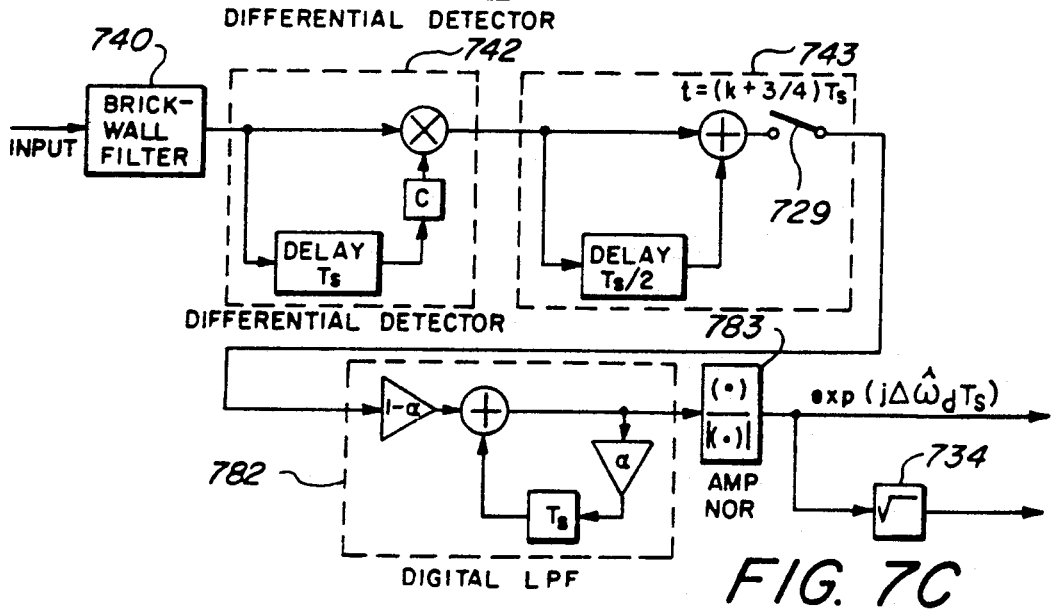
FIG. 7C depicts a fast acquisition circuit which is equivalent to that depicted in FIG. 7B.

FIG. 7C is an equivalent fast acquisition circuit which employs only one detector 742, a delay and add circuit 743, (including sampler 729), digital filter 782, normalizer 783 and square root circuit 734. The operation of the circuitry of FIG. 7C is functionally equivalent, in fast acquisition, to that of FIG. 7B and thus requires no further explanation.

Figure 8:
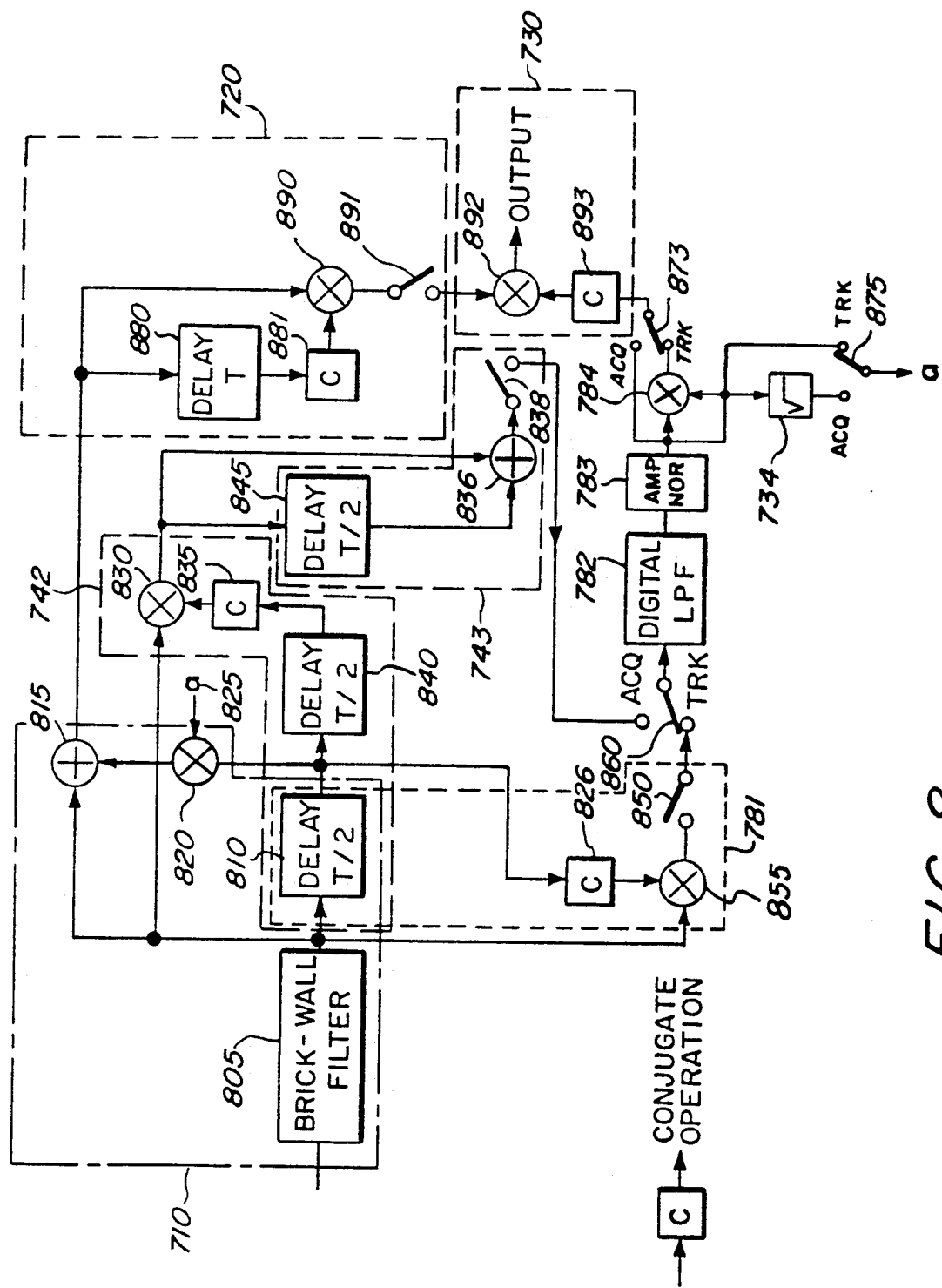
FIG. 8 is a block diagram, employing the building blocks of FIG. 7, 7A and 7C, to form a dual mode Doppler-corrected differential detector in complex form.

Only a brief correlation of the circuit components of FIG. 8 relative to the circuits of FIGS. 7, 7A, 7B or 7C need be described. FIG. 8, a simple block diagram of a dual mode receiver in complex form, is essentially the integration of the circuits shown in FIGS. 7A and 7C. In FIG. 8 some circuit elements are shared between the circuits of FIGS. 7A and 7C to reduce the complexity of the dual mode receiver of FIG. 8. Switches 860, 873 and 875 are switches to select the acquisition mode or the tracking mode. Only one mode at a time is employed. FIG. 8 components 805, 810, 820, 815 represent the pseudo-matched filter 710 of FIG. 7. Components 880, 881, 890 and 891 represent the data differential detector 720 of FIG. 7. Components 892, 893 represent the residual Doppler correction circuit 730 of FIG. 7. Components 810, 826, 850, 855, 782, 783, 784 represent the Doppler estimator in tracking mode of FIG. 7A. Components 805, 810, 840, 845, 830, 835, 836, 838, 782, 783, 734 represent the fast acquisition circuit of FIG. 7C. The operation of FIG. 8 requires no further description.

Figure 9:
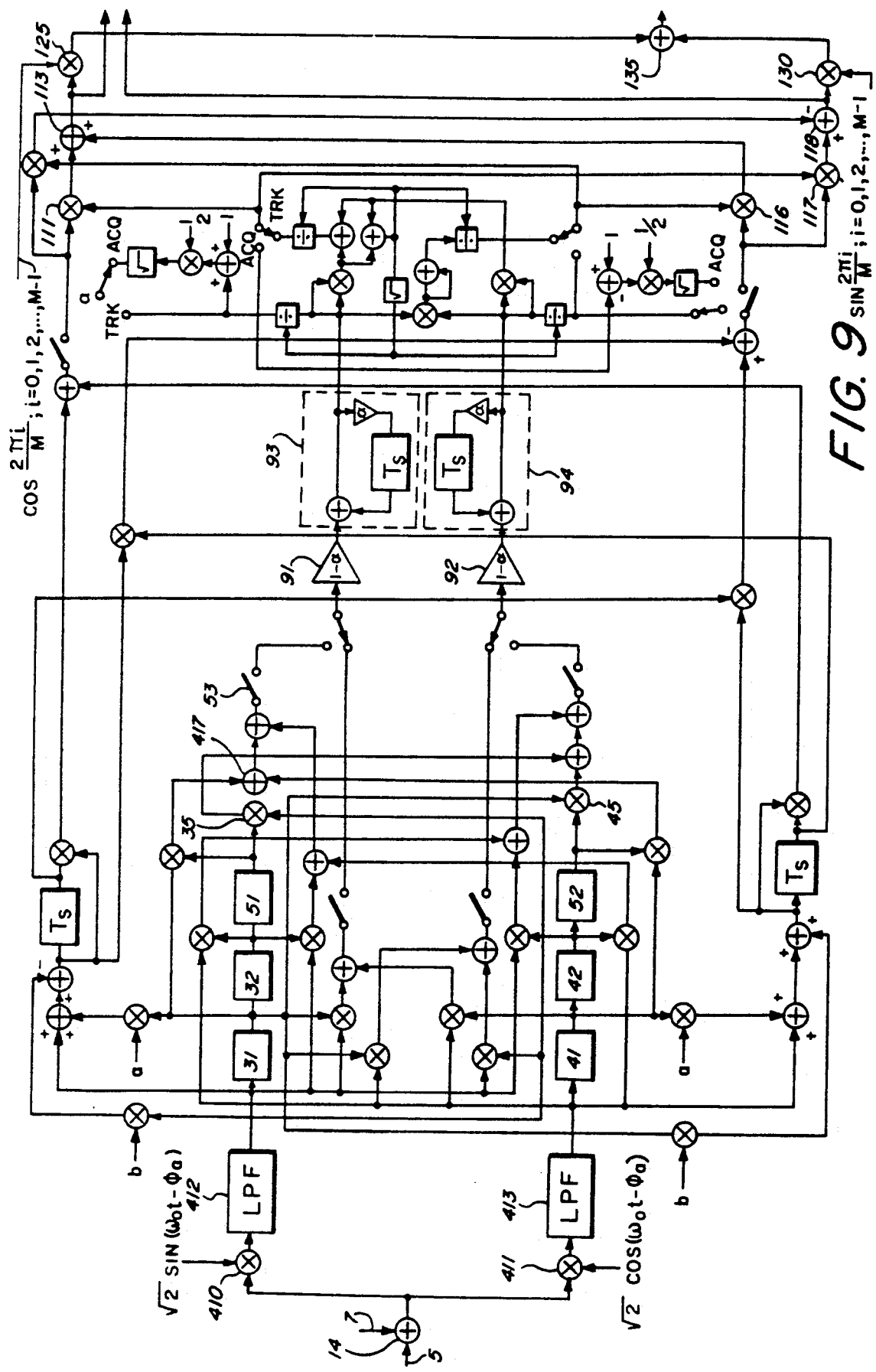
FIG. 9 is the dual mode Doppler-corrected MDPSK receiver of the invention using quadrature components of a received baseband signal.

FIG. 9 is an actual baseband I-Q implementation of the Doppler-corrected differential detector analogous to FIG. 2 but including all of the above practical considerations for the bandlimited application as incorporated in the simple illustration of FIG. 8. As described earlier, the elements 31, 32, and 51 are each delays of one-half symbol interval as are elements 41, 42 and 52. The eye diagram (FIG. 10) of the brickwall filter outputs corresponding to $\sin \theta(t)$ and $\cos \theta(t)$ is illustrated for 8DPSK. Some other practical simplifications have been made in regard to the manner in which the $\tan^{-1}$ operation is performed. In particular, the quadrature signals necessary to remove the Doppler (see FIG. 9) can be obtained by noting the following trigonometric identities.

$$\cos\left(2\tan^{-1}\frac{B}{A}\right) = A^2 - B^2 \quad (44)$$

$$\sin\left(2\tan^{-1}\frac{B}{A}\right) = 2AB$$

Also, allowance has been made for the possibility of acquisition and tracking modes of operation as discussed above.

SIMULATIONS RESULTS

Figure 13:
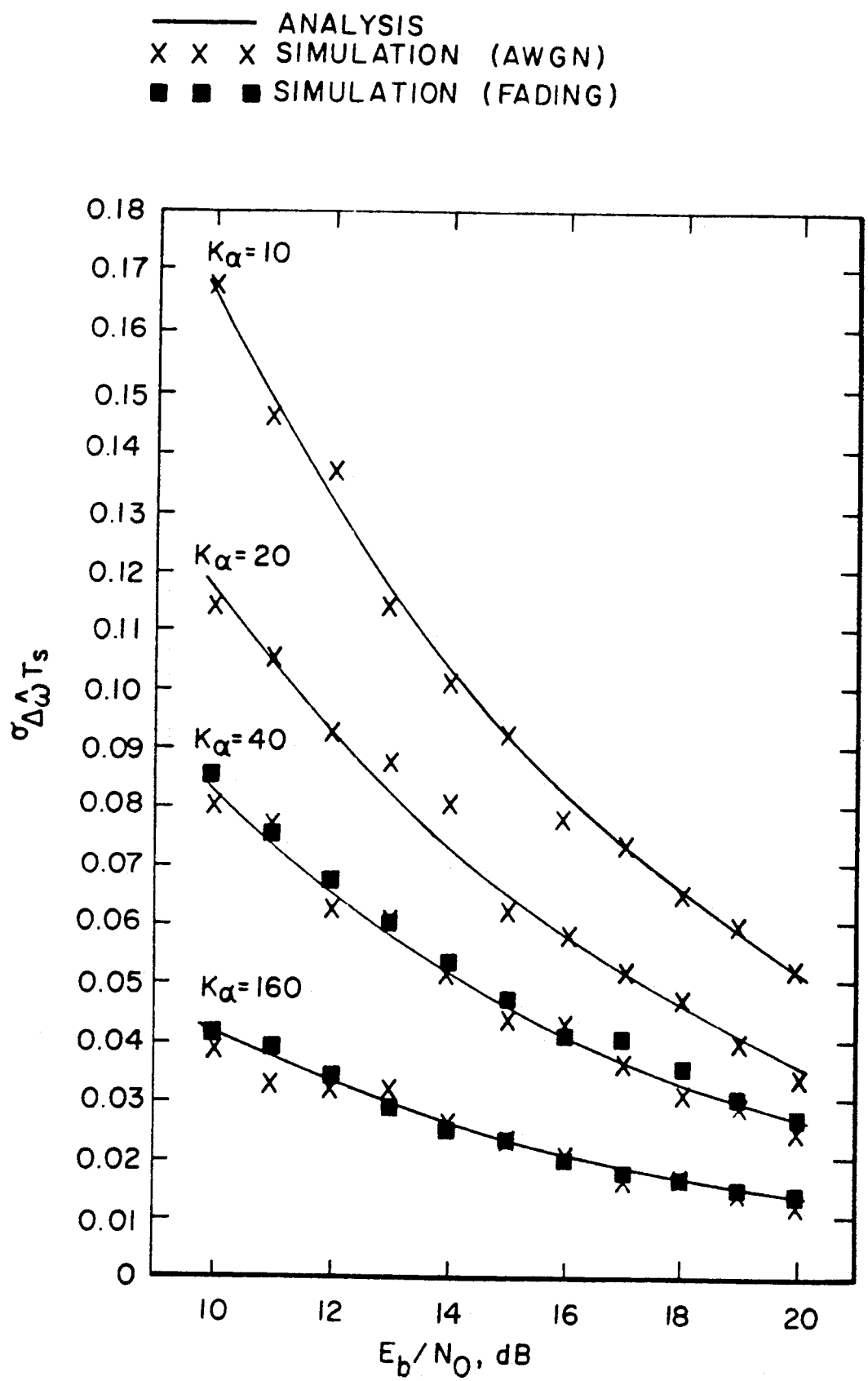
FIG. 13 is a graph depicting the improvement in results achieved by the invention in the absence of time jitter.
Figure 14:
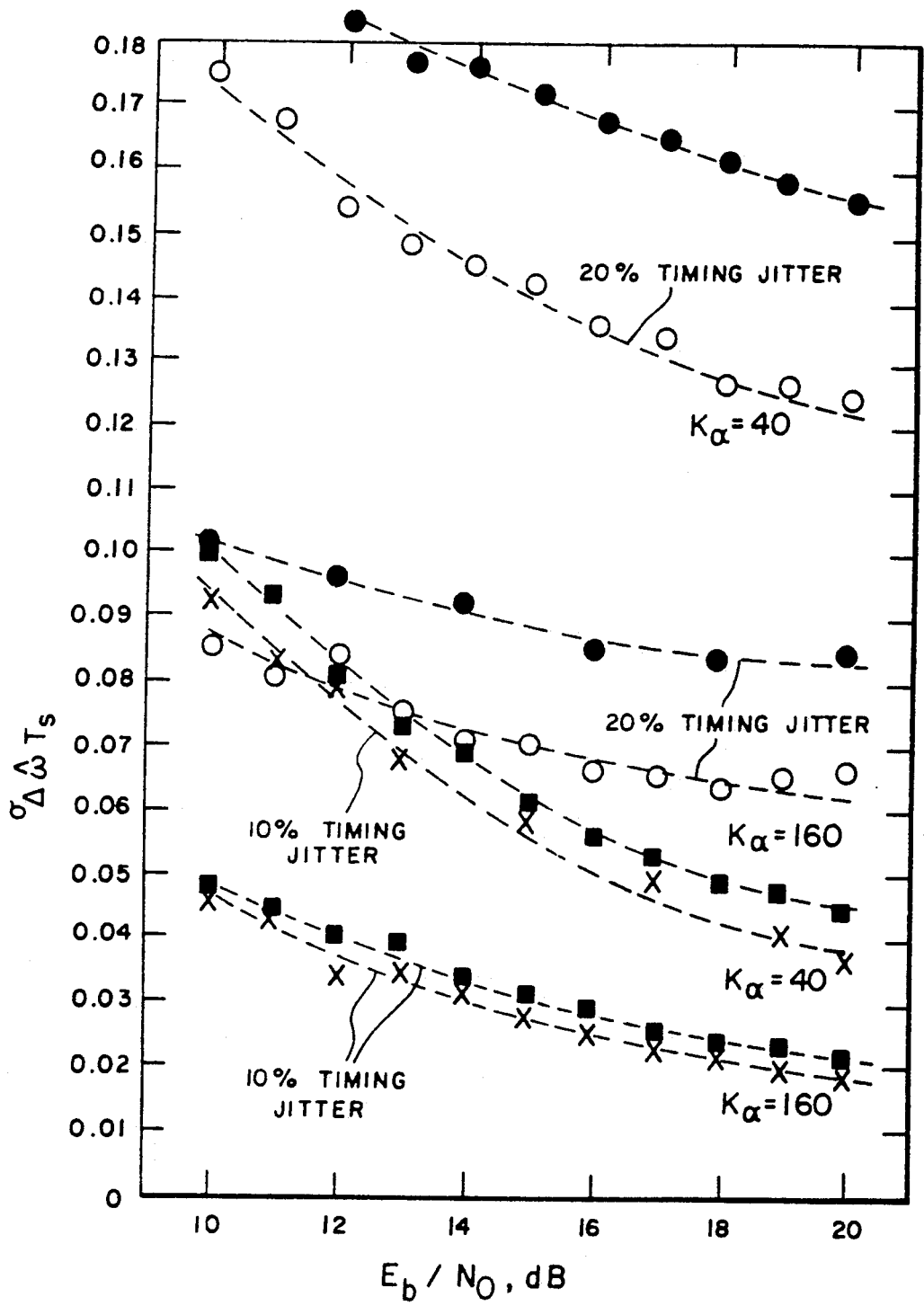
FIG. 14 is a graph similar to that of FIG. 13 depicting results in the presence of ten and twenty percent time jitter.

A software simulation of the Doppler frequency estimator was conducted and proved: 1) verification of the analytical results, and 2) inclusion of the effects of intersymbol interference (ISI) due to timing jitter on the performance of the system under consideration. The simulation and analytical results were in excellent agreement as shown by FIGS. 13 and 14 included herein.

APPENDIX A

On the Optimal Filter Split for Nyquist-Type Signaling with Two Nonzero Sample points In the foregoing, it was shown that 100% excess bandwidth root raised cosine signaling could be used to satisfy the Doppler estimation requirement of equal, zero ISI sampling points spaced $T_s/2$ apart and symmetrically placed with respect to the midpoint of the symbol interval. From the standpoint of optimum data detection, the conventional Nyquist approach is to use an equivalent flat channel (i.e., the sum of all translates of the overall frequency response should be a constant over the Nyquist bandwidth) and comparison of a single sample to a threshold. Raised cosine signaling achieves such an equivalent Nyquist channel with a single ISI-free sampling point. Thus, to use this technique in combination with the above Doppler estimation circuit, one would require an additional root raised cosine filter at the receiver. (Actually, for the baseband implementation, two such additional filters would be required; one for the I channel and one for the Q channel).

To avoid the necessity of this additional root raised cosine filter, the overall channel response remains root raised cosine, as required for the Doppler estimate, and for data detection the pair of samples taken per symbol are algebraically summed and used as a single sample for comparison with a threshold. Using the above filter split (i.e., all of the filtering at the transmitter and none at the receiver), it was shown that the error probability performance achieved was indeed equal to that using the conventional Nyquist approach (i.e., raised cosine signaling with single sample per symbol detection) as described above.

In this appendix, by interpreting the summation of two $T_s/2$-spaced samples as a simple digital filter, we show that this choice of filter split is indeed optimum in accordance with the traditional notion of putting equal amounts of the overall channel response in the transmitter and receiver.

SYSTEM MODEL

Consider the mathematical model of the system illustrated in FIG. 11. Actually, this system represents only the in-phase (I) or quadrature channel (Q) of the baseband receiver implementation. For our purpose here, it is sufficient to consider only either the I or Q channel. The data source represents either the I or Q component of the MPSK modulation and as such produces M/2-level symbols at a rate $1/T_S$. These symbols are transmitted (we consider only the baseband portion of the overall system) as a pulse sequence $mT(t)$ with pulse shape $p_T(t)$ equal to the inverse Fourier transform of the transmit filter $P_T(\omega)$. At the receiver the noise corrupted sequence $x(t)=m_T(t)+n(t)$ is passed through the receiver filter $P_R(\omega)$ to produce $y(t)=m(t)+n(t)$. As discussed above, it is desired that $m(t)$ be a pulse sequence with a pulse shape $p(t)$ such that samples of $m(t)$ taken at $t=(n+1/4)T_S$ and $t=(n+3/4)T_S$ result in zero ISI. To achieve this, we have selected $P(\omega)$ and $p(t)$ as in equations (41) and (42), respectively.

The receive filter output $y(t)$ is sampled twice per symbol as shown in FIG. 11 and the sum of these two samples is inputted to the differential detector. From the standpoint of analysis, the two samplers (A, 1110 and B, 1125) and the $T_S/2$ delay 1135 can be replaced by a simple digital filter $G(\omega)$ 1200 and a single sampler 1215 as shown in FIG. 12. Thus, by analogy with a true Nyquist channel, wherein a single sample of the output is used for purposes of data detection, we can regard samples of $z(t)$ (see FIG. 12) as the pre-detection variables and the cascade of $P_R(\omega)$ and the digital filter $G(\omega)$ as the total receive filter.

It is well known that for additive white Gaussian noise (AWGN) channels with no ISI, i.e., Nyquist pulse shaping, the average symbol error probability is minimized (with respect to the noise) by selecting identical transmit and receive filters each of whose transfer function has a magnitude response equal to the square root of the overall transmission characteristic. Thus, in terms of the equivalent representation of FIG. 11, optimum performance would be achieved by selecting $$|P_T(\omega)|^2 = |P_R(\omega)|^2 |G(\omega)|^2 = |P(\omega)|^2/|P_R(\omega)|^2 \quad (A-1)$$

However, the magnitude squared transfer function of the digital filter $G(\omega)$ is given by $$|G(\omega)|^2 = (2 \cos \omega T_S/4)^2 \text{ for all } \omega \quad (A-2)$$

Then using (41) and (A-2) in (A-1) gives the desired result, namely, $$|P_R(\omega)| = \begin{cases} \sqrt{\dfrac{T_s}{2}} \ ; \ |\omega| \leq 2\pi/T_s \\ 0; \text{ otherwise} \end{cases} \quad (A-3)$$

$$|P_T(\omega)| = \begin{cases} \sqrt{2 T_s} \cos \omega T_s/4; \ |\omega| \leq 2\pi/T_s \\ 0; \text{ otherwise} \end{cases}$$

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A receiver in a communication system which produces a Doppler effect in an incoming multiple differential phase-shift-keyed signal having a given symbol interval, with the receiver for the incoming signal having a differential detector for restoring the data by multiplying the incoming signal with a full symbol interval delayed version of itself (or an equivalent sampled version thereof) and applying the restored signal to the detector's output, said receiver comprising:

means for delaying the incoming data signal (which has the Doppler effect therein) by a half symbol interval;

means in an open-loop forward acting circuit for estimating the amount of the Doppler effect from the incoming data signal and the half-symbol delayed signal; and means for subtracting the estimated Doppler amount from the detector's output.

2. A communication system having a transmitter and the receiver of claim 1 separated by a bandlimited medium over which the transmitter sends to the receiver, a data modulated multiple differential phase-shift-keyed signal having a predetermined symbol interval, $T_s$, contaminated by said Doppler effect, said system comprising:

signal shaping split between the transmitter and the receiver to yield an impulse response at the receiver in the form of $$p(t) = \frac{4}{\pi} \left[ \frac{\cos 2\pi \dfrac{t}{T_s}}{1 - \left(\dfrac{4t}{T_s}\right)^2} \right]$$

where $t$ is time and $T_s$ is the symbol duration.

3. A communication system in accordance with claim 2 wherein said differential detector for decoding the data represented in the received signal has the Doppler effect in the detector's output, said system further comprising:

means in the detector including said receiver's signal shaping for sampling the received signal at times $t=(n+1/4) T_s$ and $(n+3/4) T_s$ to obtain intersymbol interference-free ("ISI") data signal samples, wherein "n" corresponds to the nth symbol interval of duration $T_s$ and n is any arbitrarily selected integer.

4. A communication system in accordance with claim 3 wherein said means for removing the Doppler effect from the differential detector output, further comprises:

means for multiplying said ISI samples with the Doppler estimating amount from said subtracting means as a Doppler-correcting error to cancel the Doppler effect from the differential detector's output.

5. A communication system in accordance with claim 1 wherein the Doppler effect introduces a Doppler-induced phase change that tends to mask differential phase changes encoded in said incoming data signal, and said system includes a receiver which is further characterized in that:

said Doppler effect estimating means is responsive to the change in phase of said incoming signal over a full symbol interval, which incoming signal contains both the differentially encoded data and the Doppler-induced phase change, whereas the same phase change over half a symbol interval contains only the Doppler-induced phase change.

6. A communication system in accordance with claim 2 wherein said signal shaping is provided by transmit and receive filters with the transmitter filter taking the form of a square root raised cosine characteristic, the improvement in said system comprising:

a filter at the receiver having a characteristic matched to the transmitter's filter and also exhibiting a square root raised cosine characteristic that is formed from an ideal low pass filter with its output connected in tandem to a summer, which summer receives the low pass filter's output, and a half symbol delayed version of that filter's output.

7. A communication system in accordance with claim 6 wherein the symbol interval is expressed as $T_s$ and the transmitter's filter has 100% excess bandwidth and further wherein said receiver's ideal low pass filter has a bandwidth equal to $1/T_s$ expressed in Hertz.

8. A communication system in accordance with claim 6 wherein the symbol interval is expressed as $T_s$ and wherein the transmitted signal experiences a maximum Doppler frequency shift ("$f_{d,MAX}$") and further wherein said receiver's ideal low pass filter has a bandwidth of $1/T_s$ (in $H_z$) plus $f_{d,MAX}$.

9. A communication system in accordance with claim 8 wherein the low pass filter's output is connected to a Doppler correcting circuit, and wherein said system is further characterized:

said means in an open loop forward acting circuit which receives the low pass filter's output, for estimating said Doppler-correcting error signal, which error signal is indicative of the amount of Doppler correction that is required at the detector's output.

10. A communication system in accordance with claim 9 wherein the data at the transmitter is encoded as multiple differential phase-shift-keyed changes in each of said symbol intervals, and further wherein said receiver includes a data detector;

said data detector including a full symbol delay $T_s$ and a multiplier circuit for multiplying the incoming data signal with a full-symbol-interval delayed version of itself.

11. A communication system in accordance with claim 9 wherein the Doppler correcting circuit further comprises, as said half symbol delay means, a:

half symbol delay circuit for delaying the incoming data signal by a delay time of one-half ($T_s/2$) of said symbol interval;
means for multiplying that half delayed signal with the incoming data signal; and
means for further processing the multiplied signal from said multiplying means before said signal is applied to said detector's output as a Doppler error correction signal.

12. The communication system of claim 11 wherein the Doppler error processing means, in said Doppler correcting circuit of claim 11, further comprises:

means for sampling the received signal at times $t = (n + +1/4) T_s$ and $(n+3/4) T_s$, where "n" corresponds to the nth symbol interval of duration $T_s$ and n is any arbitrarily selected integer, and
means for multiplying the sampled signals from said sampling means with said detector's output.

13. A communication system having a transmitter and a receiver separated by a bandlimited channel over which the transmitter sends to the receiver, a multiple differential phase-shift-keyed signal ("MDPSK") having a predetermined symbol interval, $T_s$, contaminated by a Doppler effect, said system comprising:

signal shaping means split between the transmitter and the receiver to yield an impulse response at the receiver in the form of $$p(t) = \frac{4}{\pi} \left[ \frac{\cos 2\pi \frac{t}{T_s}}{1 - \left(\frac{4t}{T_s}\right)^2} \right]$$

where t is time and $T_s$ is the symbol duration,
an ideal low pass filter in said signal shaping means for filtering the incoming signal,
means in said receiver for sampling the received and filtered incoming signal at times $t=(k+1/4) T_s$ where k is equal to 1, 2, 3 etc. and $(k+3/4) T_s$ to obtain Doppler error samples, and
an open loop feedforward circuit in said receiver connected to said sampling means for removing the Doppler effect from the incoming signal in accordance with said Doppler error samples from said sampling means.

14. A system in accordance with claim 13 wherein the open loop feedforward circuit further comprises:

means delaying the incoming signal with the Doppler effect therein, by a half symbol interval for comparison with the incoming signal itself to form the Doppler removal signal.

15. An improved communication system of the type that experiences a Doppler effect in a signal which is being transmitted over a link between the system's modulator and demodulator, said system including a receiver with an input for the Doppler-affected incoming signal and an output terminal, for supplying decoded data, and comprising:

a modulator at the system's transmitter for impressing information as differential phase-shift-keyed changes on a transmitted carrier as an output signal;
a Doppler-inducing communication medium that causes a Doppler phase error to become embedded in the transmitted signal;
a system receiver operative on the incoming signal for both removing the Doppler phase error and restoring the information from the differential phases in said incoming signal, said receiver including:
a demodulator connected to receive the incoming signal and restore therefrom the transmitted information which still has the Doppler phase error in the restored signal;
a sensing circuit receiving the incoming signal and responsive to a particular portion of each symbol interval of the incoming signal having only the Doppler-phase therein for deriving a Doppler error correction signal; and
a forward acting open loop correction circuit connected to said sensing circuit for removing the Doppler phase error from said restored signal so that information only is available at the receiver's output terminal.

16. An improved communication system for communicating information, encoded by differential phase changes in symbol intervals, over a communication link which introduces a Doppler-induced phase change that tends to mask the encoded differential phase changes, said system improvement being based upon the recognition that, at a receiver, the change in phase of a received incoming signal over a full symbol interval contains both the differentially encoded data and the Doppler-induced phase change, whereas the same phase change over half a symbol interval contains only the Doppler-induced phase change, and said system improvement comprising at the system's receiver:

an input signal receiving terminal;

means connected to said terminal and operative over a half symbol interval in response to said input signal for deriving therefrom a Doppler estimate signal that is indicative of the Doppler-induced phase change which is present in the incoming signal;

means connected to said input terminal and operative over a full symbol interval in response to said input signal for deriving therefrom a detected output signal which is indicative of the data encoded phase change and including the Doppler-induced phase change as an undesired part of the detected output signal; and means applying the Doppler estimate to the detected output signal for canceling the undesired Doppler-induced phase change from the detected output signal.

17. A communication system for symbol interval data in an environment with Doppler frequency shift and having a signal transmitter and a signal receiver connected together via a communication medium, and having transmit and receive filters with the transmitter filter taking the form of a square root raised cosine characteristic, the improvement in said system having an estimate of said Doppler frequency shift and comprising:

a filter at the receiver having a characteristic pseudo matched to the transmitter's filter and also exhibiting a square root raised cosine characteristic only in absence of Doppler shift, said filter being formed from an ideal low pass filter with its output connected in tandem to a summer, which summer receives the low pass filter's output, and a half symbol delayed version of that filter's output, which half symbol delayed version is corrected by said Doppler estimate.

18. An improved communication system of claim 17 and further comprising:

means at the transmitter for transmitting, as part of a data signal, a known sequence of phase shifts; and means at the receiver responsive to that known sequence for acquiring a Doppler error signal during the time of receipt of that known sequence.

19. An improved communication system of claim 18 and further comprising:

means at the receiver responsive to said Doppler error acquiring means for condition achieving Doppler correction during the receipt of unknown data phase shifts by said receiver.

20. A communication system in accordance with claim 17 wherein the symbol interval is expressed as $T_s$ and the transmitter's filter has 100% excess bandwidth and further wherein said receiver's:

ideal low pass filter has a bandwidth equal to $1/T_s$ (expressed in $H_z$).

21. A communication system in accordance with claim 17 wherein the symbol interval is expressed as $T_s$ and wherein the transmitted signal experiences a maximum Doppler frequency shift ("$f_{d,MAX}$") and further wherein said receiver's:

ideal low pass filter has a bandwidth of $1T_s$ (in $H_z$ per second) plus $f_{d,MAX}$.

22. A communication system in accordance with claim 21 wherein the low pass filter's output is connected to a Doppler correcting circuit, and further wherein said Doppler correcting circuit is characterized by:

means in an open loop forward acting circuit which receives the low pass filter's output for estimating therefrom, a Doppler error signal, which error signal is indicative of the amount of Doppler correction that is required;

a data detector for restoring data at the receiver and making the restored data available at the detector's output; and means for removing the Doppler from the restored data of said detector by applying said Doppler error signal from said estimating means to the detector's output.

23. A communication system in accordance with claim 22 wherein the data is encoded as multiple differential phase changes in said symbol intervals, and further wherein:

said data detector is a multiple differential phase decoder for restoring the data in a data output signal that is formed by multiplying, at a multiplier circuit, the incoming data signal with a full symbol interval delayed version of itself.

24. A communication system in accordance with claim 23 wherein the Doppler correcting circuit further comprises:

means for delaying the incoming data signal by a delay time of one-half of the symbol interval's means for multiplying that half delayed signal with the incoming data signal; and means for further processing the multiplied signal from said multiplying means before said signal is applied to said detector's output as a Doppler error correction signal.

25. The communication system of claim 23 wherein the processing means further comprises:

means for sampling the multiplied signal at times $t=(n++1/4)T_s$ and $(n+3/4)T_s$, where "n" corresponds to the nth symbol interval of duration $T_s$ and n is any arbitrarily selected integer; and means for multiplying the sampled signals from said sampling means with said detector's output.

26. A receiver in a communication system which produces a Doppler effect in an incoming multiple differential phase-shift-keyed signal having a given symbol interval, with the receiver for the incoming signal having a differential detector for restoring the data by multiplying the incoming signal with a full symbol interval delayed version of itself (or an equivalent sampled version thereof), said receiver comprising:

means for delaying the incoming data signal (which has an unwanted Doppler effect therein) by a half symbol interval; and an open-loop forward acting circuit means connected to said delaying means for deriving an estimated amount of the Doppler effect from the signal to be restored, the estimated amount then being used to cancel the unwanted Doppler.

27. A communication system having a transmitter and the receiver separated by a bandlimited medium over which the transmitter sends to the receiver, a data modulated multiple differential phase-shift-keyed signal or a multiple phase-shifted-keyed signal, with each signal having a predetermined symbol interval, $T_s$, contaminated by an unwanted Doppler effect that may be removed by samples, a half symbol-interval apart, from the incoming signal, said system comprising:

signal shaping split between the transmitter and the receiver to yield an impulse response at the receiver, where said signal shaping is connected, with said impulse being in the form of $$p(t) = \frac{4}{\pi} \left[ \frac{\cos 2\pi \frac{t}{T_s}}{1 - \left(\frac{4t}{T_s}\right)^2} \right]$$

where t is time and $T_s$ is the symbol duration, and said signal shaping yields samples for Doppler removal that are a half symbol duration apart; and means connected to said signal shaping means and responsive to said samples yielded thereby for correcting for said unwanted Doppler effect.

28. The communication system of claim 27 wherein the Doppler error is removed by samples taken a half symbol duration apart for Doppler correction, said system further comprising:

means for sampling the multiplied signal at times $t=(n+1/4)T_s$ and $(n+3/4)T_s$, where n corresponds to the nth symbol interval of duration $T_s$ and n is any arbitrarily selected integer, in order to obtain two independent samples; and Doppler correcting means responsive to said independent samples for correcting for said unwanted Doppler.

29. A receiver in a communication system which produces a Doppler effect in an incoming multiple phase-shift-keyed signal having a given symbol interval, with the receiver for the incoming signal having a matched filter detector for restoring the data after Doppler removal, said receiver comprising:

means for delaying the incoming data signal (which has the Doppler effect therein) by a half symbol interval; and an open-loop forward acting circuit means connected to said delaying means for estimating the amount of the Doppler effect from the signal to be restored, the estimate of which is then used to cancel the Doppler.

30. A communication system for symbol interval data having a signal transmitter and a signal receiver connected together via a communication medium, and having transmit and receive filters with the transmitter filter taking the form of a square root raised cosine characteristic, the improvement in said system comprising:

a filter at the receiver having a characteristic matched to the transmitter's filter and also exhibiting a square root raised cosine characteristic that is formed from an ideal low pass filter with its output connected in tandem to a summer, which summer receives the low pass filter's output, and a half symbol delayed version of that filter's output, means at the transmitter for transmitting, as part of a data signal, a known sequence of phase shifts; and means at the receiver responsive to that known sequence for acquiring ("ACQ") a Doppler error signal during the time of receipt of that known sequence.

31. An improved communication system of claim 30 and further comprising:

means at the receiver responsive to the acqui-sition of the Doppler correction by said Doppler error acquiring means for assuming a tracking condition wherein the Doppler correction takes place during the receipt of unknown data phase shifts by said receiver.

* * * * *